United States Patent
Onoue et al.

(10) Patent No.: US 9,064,518 B2
(45) Date of Patent: Jun. 23, 2015

(54) PERPENDICULAR MAGNETIC RECORDING MEDIUM

(75) Inventors: Takahiro Onoue, Singapore (SG); Teiichiro Umezawa, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 320 days.

(21) Appl. No.: 13/062,640

(22) PCT Filed: Sep. 16, 2009

(86) PCT No.: PCT/JP2009/066200
§ 371 (c)(1),
(2), (4) Date: May 5, 2011

(87) PCT Pub. No.: WO2010/032767
PCT Pub. Date: Mar. 25, 2010

(65) Prior Publication Data
US 2011/0223446 A1   Sep. 15, 2011

(30) Foreign Application Priority Data

Sep. 16, 2008   (JP) .................................. 2008-236271
Sep. 26, 2008   (JP) .................................. 2008-249266

(51) Int. Cl.
*G11B 5/66*   (2006.01)
*G11B 5/65*   (2006.01)

(52) U.S. Cl.
CPC ... *G11B 5/66* (2013.01); *G11B 5/65* (2013.01)

(58) Field of Classification Search
None
See application file for complete search history.

(56) References Cited

U.S. PATENT DOCUMENTS

2004/0053078 A1   3/2004   Kikitsu et al.
2005/0058855 A1*  3/2005   Girt .......................... 428/694 TS
(Continued)

FOREIGN PATENT DOCUMENTS

JP   05-073881      3/1993
JP   2003-346315   12/2003
(Continued)

OTHER PUBLICATIONS

Japanese Office Action dated Oct. 29, 2013 for related Japanese Application No. 2009-132234 4 pages.
(Continued)

*Primary Examiner* — Holly Rickman
*Assistant Examiner* — Lisa Chau

(57) ABSTRACT

An object of the present invention is to provide a perpendicular magnetic recording medium the SNR of which is further improved while a high coercive force Hc is secured so that a higher recoding density can be achieved.

The structure of a perpendicular magnetic recording medium 100 according to the present invention includes, on a base, at least a first magnetic recording layer 122a having a granular structure in which a non-magnetic grain boundary portion is formed between crystal particles grown in a columnar shape; a non-magnetic split layer 122b containing Ru disposed on the first magnetic layer; and a second magnetic recording layer 122c that is disposed on the split layer and that has a granular structure in which a non-magnetic grain boundary portion is formed between crystal particles grown in a columnar shape, wherein the first magnetic layer and the second magnetic layer contain oxides that form the grain boundary, and when an oxide content of the first magnetic layer is represented by A and an oxide content of the second magnetic layer is represented by B, a relationship between the oxide contents A/B is in the range of 0.5<A/B<1.0.

9 Claims, 11 Drawing Sheets

(56) References Cited

U.S. PATENT DOCUMENTS

| | | |
|---|---|---|
| 2006/0269799 A1 | 11/2006 | Do et al. |
| 2008/0096053 A1* | 4/2008 | Bian et al. .................... 428/829 |
| 2009/0117408 A1 | 5/2009 | Umezawa et al. |

FOREIGN PATENT DOCUMENTS

| | | |
|---|---|---|
| JP | 2004-039033 A | 2/2004 |
| JP | 2006-024346 | 1/2006 |
| JP | 2006-331622 A | 12/2006 |
| JP | 2007-220177 | 8/2007 |
| JP | 2007-273057 | 10/2007 |
| JP | 2007-317255 | 12/2007 |
| JP | 2009-099243 | 5/2009 |
| JP | 2009-245479 | 10/2009 |
| JP | 2010-009683 | 1/2010 |
| WO | 2007/114402 A1 | 10/2007 |

OTHER PUBLICATIONS

Japanese Decision of Refusal dated Mar. 25, 2014 for related Japanese Application No. 2009-132234 2 pages.

T. Oikawa, et al., "Microstructure and Magnetic Properties of CoPtCr—SiO2 Perpendicular Recording Media," IEEE Transactions of Magnetics, vol. 38, Issue 5, Nov. 30, 2001, pp. 1, (English Summary).

* cited by examiner

EXAMPLES DIFFERENT IN COMPOSITION OF SPLIT LAYER

| | FIRST SPLIT LAYER | SECOND MAGNETIC RECORDING LAYER | SECOND SPLIT LAYER | Hc[Oe] | Hn[Oe] | SNR[dB] |
|---|---|---|---|---|---|---|
| EXAMPLE12 | Ru | CoCrPt-SiO2-TiO2+CoO | RuWO3 | 5430 | 2650 | 17.1 |
| EXAMPLE14 | Ru | CoCrPt-SiO2-TiO3+CoO | RuSiO2 | 5030 | 2430 | 16.7 |
| EXAMPLE15 | Ru | CoCrPt-SiO2-TiO4+CoO | Ru+O2 | 5310 | 2490 | 16.9 |
| EXAMPLE16 | Ru | CoCrPt-SiO2-TiO5+CoO | Ru | 3870 | 2090 | 15.6 |

FIG. 11
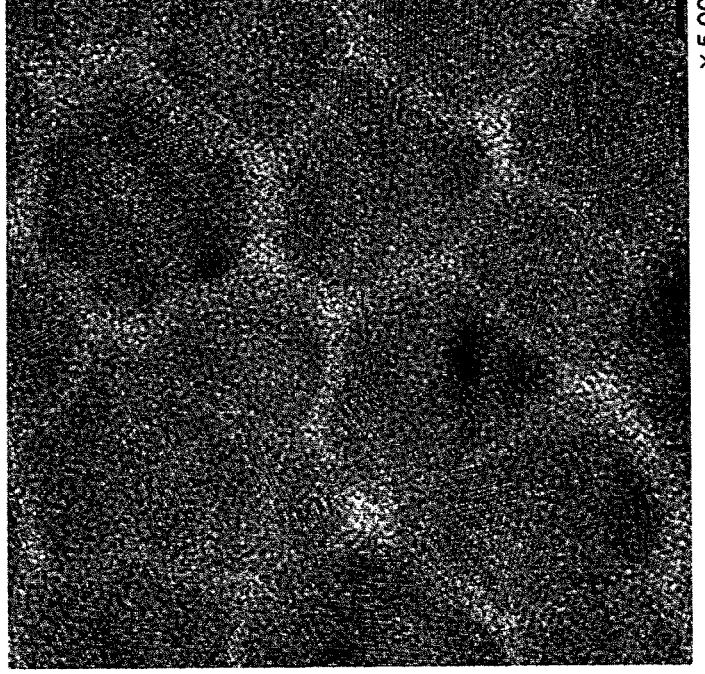
COMPARATIVE EXAMPLE 11
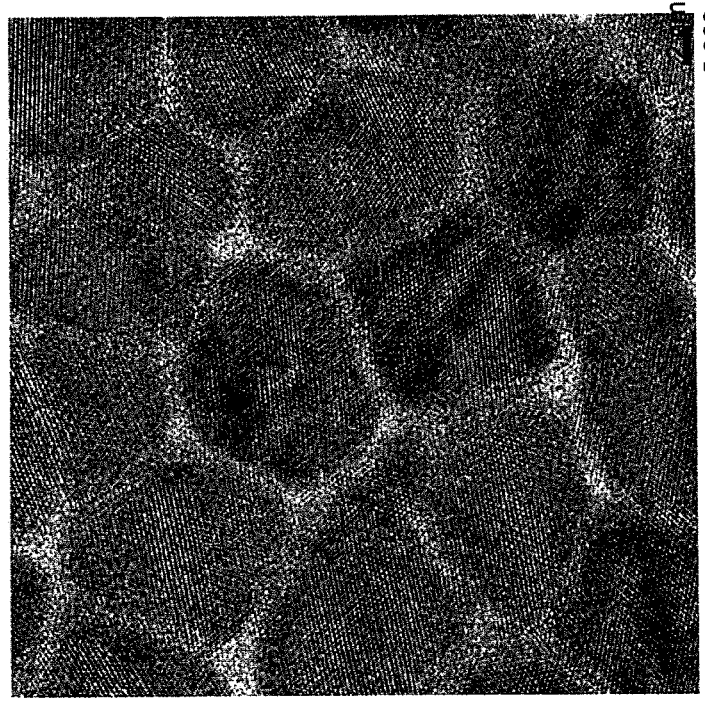
EXAMPLE 11

PERPENDICULAR MAGNETIC RECORDING MEDIUM

CROSS REFERENCE TO RELATED APPLICATONS

This application is a National Stage of International Application No. PCT/JP2009/066200 filed Mar. 7, 2011, claiming priority based on Japanese Patent Application No. 2008-236271 filed Sep. 16, 2008, and Japanese Patent Application No. 2008-249266 filed Sep. 26, 2008, the contents of all of which are incorporated herein by reference in their entity.

TECHNICAL FIELD

The present invention relates to a perpendicular magnetic recording medium to be mounted on an HDD (hard disk drive) or the like of a perpendicular magnetic recording type.

BACKGROUND ART

With an increase in capacity of information processing in recent years, various information recording technologies have been developed. In particular, the surface recording density of an HDD using a magnetic recording technology is continuously increasing at an annual rate of approximately 100%. In recent years, an information recording capacity exceeding 200 gigabytes per perpendicular magnetic recording medium with a 2.5-inch diameter for use in an HDD or the like has been demanded. To fulfill such a demand, an information recording density exceeding 400 gigabits per square inch is desired to be achieved.

To achieve a high recording density in a magnetic recording medium for use in an HDD or the like, a perpendicular magnetic recording type has been proposed in recent years. In a perpendicular magnetic recording medium for use in the perpendicular magnetic recording type, the axis of easy magnetization of a magnetic recording layer is adjusted so as to be oriented in a direction perpendicular to the base surface. In the perpendicular magnetic recording type, compared with a conventional in-plane recording type, it is possible to more suppress a so-called thermal fluctuation phenomenon, in which thermal stability of a recording signal is impaired because of a superparamagnetic phenomenon to cause the recording signal to be lost, and therefore the perpendicular magnetic recording type is suitable for increasing the recording density.

As a magnetic recording medium for use in the perpendicular magnetic recording type, a CoCrPt—$SiO_2$ perpendicular magnetic recording medium (refer to Non-Patent Document 1) has been proposed because of high thermal stability and excellent recording characteristic. This is to configure a granular structure in a magnetic recording layer in which a non-magnetic grain boundary part with segregation of $SiO_2$ is formed between magnetic particles in which a crystal with an hcp structure (a hexagonal close-packed crystal lattice) of Co continuously grows in a columnar shape, thereby achieving finer magnetic particles and an improvement of a coercive force Hc together. It is known that an oxide is used for the non-magnetic grain boundary (a non-magnetic portion between magnetic particles), and, for example, using any one of $SiO_2$, $Cr_2O_3$, TiO, $TiO_2$, and $Ta_2O_5$ has been proposed (Patent Document 1).

The magnetostatic characteristic and electromagnetic conversion characteristic of a magnetic layer having the granular structure can be adjusted by changing kinds of oxides that form the grain boundary or changing oxide contents. Both high coercive force and low noise are important, but they have a tradeoff relationship that, as one of them increases, the other decreases. Therefore, conventionally, the magnetic recording layer is divided into plural layers so that they take different roles. For example, by providing a layer that contains a smaller amount of oxide to achieve improvement in coercive force Hc and a layer that contains a larger amount of oxide to achieve improvement in SNR (Signal to Noise Ratio), the advantages of both the oxides can be obtained.

However, when an intense magnetic field is applied to the magnetic recording layer, leak field to an adjacent track becomes large, so that WATE (wide Area Track Erasure), namely, a phenomenon, that recorded information within the range of several micrometers from a track to write on is lost, is problematic. As means for reducing WATE, it is important to set a reversed magnetic domain nucleation field Hn of the magnetic recording layer at a negative value, and increase the absolute value thereof. In order to obtain a high (large in absolute value) Hn, a CGC (Coupled Granular Continuous) medium in which a thin film having a high perpendicular magnetic anisotropy is formed above or below the magnetic recording layer having a granular structure was devised (Patent Document 2).

The CGC medium shown in Patent Document 2 has a structure in which a CoB magnetic film and a Pd non-magnetic thin film are stacked one on top of another, and uses their exchange coupling to obtain a high Hn. However, in the CGC medium, the exchange coupling cannot be obtained unless the magnetic film is a thin film, and it is required to stack CoB films and Pd films alternately three times because only one for each layer is less effective. Therefore, in recent years, it is often found that an auxiliary recording layer which is a single layer having high perpendicular magnetic anisotropy and which is magnetically approximately continuous in an in-plane direction of a main surface of a base is formed on the magnetic recording layer.

As the coercive force Hc of the magnetic recording layer is more improved, a higher recording density can be achieved but writing by the magnetic head tends to be more difficult. Then, an auxiliary recording layer improves saturated magnetization Ms and also contributes to improving easy writing, namely, an overwrite characteristic. In other words, objects of disposing the auxiliary recording layer on the magnetic recording layer are to improve the reversed magnetic domain nucleation filed Hn to reduce noise, and to improve the saturated magnetization Ms to improve the overwrite characteristic. Note that the auxiliary recording layer may be referred to as a continuous layer or cap layer.

PRIOR ART DOCUMENT

Non-Patent Document

[Non-Patent Document 1] T. Oikawa et. al., IEEE Trans. Magn., vol. 38, 1976-1978 (2002)

Patent Document

[Patent Document 1] Japanese Unexamined Patent Application Publication No. 2006-024346

[Patent Document 2] Japanese Unexamined Patent Application Publication No. 2003-346315

DISCLOSURE OF INVENTION

Problems to be Solved by the Invention

In the magnetic recording medium with such increased recording density as described above, a further improvement in recording density is demanded for the future. Important factors for increasing recording density of the perpendicular magnetic recording medium include an improvement in magnetostatic characteristic, such as a coercive force Hc and a reversed magnetic domain nucleation magnetic field Hc; and an improvement in electromagnetic conversion characteristic, such as an overwrite characteristic, an SNR (Signal to Noise Ratio), and narrowing of a track width. Of them, the improvement in coercive force Hc and the improvement in SNR are important for reading and writing accurately at high speed even at a recording bit of a small area.

The improvement in SNR is achieved mainly by reducing noise in a magnetization transition region of the magnetic recording layer. Effective factors for reducing noise include an improvement in crystalline orientation of the magnetic recording layer, making particle diameters of magnetic particles finer, and isolation of the magnetic particles. Of them, when isolation of magnetic particles is promoted, magnetic interaction between adjacent magnetic particles is interrupted. Therefore, noise can be greatly reduced and the SNR can be significantly improved. In the perpendicular magnetic recording medium of the above granular structure, magnetic particles are isolated and refined by using an oxide to form a grain boundary, thereby improving the SNR.

However, as described above, simply increasing the amount of oxide in the magnetic recording layer in order to promote isolation of magnetic particles causes reduction in coercive force Hc, resulting in deterioration in recording and reproducing characteristic. Therefore, both the characteristics of a high coercive force and a high SNR are obtained by configuring the magnetic recording layer to have plural layers, one of which is a layer having high coercive force Hc and the other of which is a layer having a high SNR, but noise due to a layer having a high coercive force Hc becomes a problem. Therefore, conventionally, the noise is suppressed by thinning the film thickness of the layer having a high coercive force. However, it is necessary to secure a minimum required coercive force, and accordingly it is inevitable to allow a certain amount of noise.

Further, the auxiliary recording layer described above does not have a granular structure but has a structure that is magnetically approximately continuous in an in-plane direction. This makes it possible for the auxiliary recording layer to improve the overwrite characteristic but causes increase in noise. In particular, the auxiliary recording layer is positioned at an upper portion of the medium, and therefore has a large effect on the increase in noise. However, without the auxiliary recording layer, the OW characteristic enormously lowers, and a recent magnetic recording layer having a high coercive force can no longer be written. This makes it inevitable to allow a certain amount of noise.

Therefore, in the above techniques, it is inevitable to allow the noise to increase to a certain degree in order to secure a high coercive force Hc, and accordingly the improvement in SNR has reached a limit. Therefore, in order to achieve a higher recording density of the magnetic recording medium, it is a problem to be solved to establish a new technique that can improve the SNR further while securing high coercive force Hc.

In view of such a problem to be solved, an object of the present invention is to provide a perpendicular magnetic recording medium the SNR of which is further improved while a high coercive force Hc thereof is secured so that a higher recording density can be achieved.

Means for Solving the Problems

In order to solve the above problem, the inventors of the present invention have conducted careful examination and have focused on reducing the noise due to the magnetic recording layer. That is, the inventors have thought that there is a possibility that a magnetized state of the magnetic recording layer may affect noise generation. Then, they have accumulated their studies, and have found that the above problem to be solved is solved by configuring the magnetic recording layer to have two layers, a first magnetic layer and a second magnetic layer, and interposing therebetween a non-magnetic split layer containing Ru so that the direction of magnetization of the magnetic recording layer, in particular the first magnetic layer is controlled to reduce the noise, and they have completed the present invention.

That is, in order to solve the above problem, a representative configuration of a perpendicular magnetic recording medium according to the present invention is characterized by including, on a base, at least a first magnetic layer having a granular structure in which a non-magnetic grain boundary portion is formed between crystal particles grown in a columnar shape; a non-magnetic split layer containing Ru disposed on the first magnetic layer; and a second magnetic layer that is disposed on the split layer and that has a granular structure in which a non-magnetic grain boundary portion is formed between crystal particles grown in a columnar shape, wherein the first magnetic layer and the second magnetic layer contain oxides which form the gain boundary portion, and when an oxide content of the first magnetic layer is represented by A and an oxide content of the second magnetic layer is represented by B, a relationship between the oxide contents A/B is in the range of $0.5<A/B<1.0$.

According to the above configuration, since the split layer containing Ru is interposed between the first magnetic layer and the second magnetic layer, antiferro-magnetic exchange coupling (AFC), which is a magnetic interaction, can be generated between the magnetic recording layers. This makes it possible to arrange the direction of magnetization of the first magnetic layer and the direction of magnetization of the second magnetic layer in an antiparallel manner to each other (so as to be opposite to each other), thereby causing them to interact so as to fix the directions of magnetization thereof.

Furthermore, since the relationship between the oxide contents A/B is in the range of $0.5<A/B<1.0$, the oxide contents of the first magnetic layer and the second magnetic layer can be set properly so that the first magnetic layer becomes a layer having a reduced amount of grain boundary portion and having a high coercive force Hc, and the second magnetic layer becomes a layer having a large amount of grain boundary portion and having a high SNR. Therefore, it becomes possible to further improve the SNR of the perpendicular magnetic recording medium while keeping a high coercive force Hc thereof. In addition, since the first magnetic layer has a high coercive force Hc, the first magnetic layer can act as a pin layer that fixes the direction of magnetization of the second magnetic layer.

It is preferred that the split layer described above have a film thickness in the range of 2 Å to 10 Å. The split layer the film thickness of which is set in such a range can interrupt magnetism between the first magnetic layer and the second magnetic layer to generate AFC.

Note that, if the film thickness of the split layer is set at 10 Å or more, the exchange coupling generated between the magnetic recording layers is weakened, and therefore it becomes impossible to obtain a desired SNR. Furthermore, if the film thickness is as thick as 10 Å or more, the magnetic recording layers on and just below the split layer are magnetically completely separated from each other and inheritance of crystal orientation from one to the other is completely lost. On the other hand, if the film thickness of the split layer is 2 Å or less, the magnetism between the first magnetic layer and the second magnetic layer cannot be interrupted, and therefore it becomes impossible to generate AFC. In addition, the split layer having a film thickness in a range of 2 Å or less cannot form a coating film. Note that, here, the coating film may not necessarily be continuous, for example, the film may deposit in an island shape as long as it can fulfill its function.

It is preferred that the split layer described above is composed of Ru or a Ru alloy. Because Ru has a crystalline form (hcp) similar to Co that composes the magnetic particles, and therefore Ru does not easily disturb epitaxial growth of Co crystal particles even if it is interposed between the magnetic recording layers.

It is preferred that the Ru alloy is selected from a group consisting of RuO, RuCo, RuCr, $RuSiO_2$, $RuTiO_2$, $RuCr_2O_3$, $RuWO_3$, and $RuTa_2O_5$. These Ru alloys, among various Ru alloys, are most effective in securing a high coercive force Hc and improving the SNR.

In particular, when the Ru alloy is RuO or when it contains an oxide, the split layer contains oxygen atoms. Thereby, in a portion of the split layer positioned on the grain boundary with the granular structure in the first magnetic layer, the oxygen atoms contained in the split layer have a high affinity with oxygen atoms contained in the grain boundary in the first magnetic layer, so that the portion inherits the grain boundary structure of the magnetic layer as a Ru oxide. Also, when the split layer contains an oxide, the oxide becomes high in affinity with the grain boundary of the first magnetic layer, and similarly inherits the grain boundary structure of the first magnetic layer. Therefore, in both the cases, it is possible to grow Co crystal particles in the second magnetic layer, without the split layer interfering with the inheritance of the grain boundary structure of the first magnetic layer.

Note that, as a specific means for causing the split layer to contain Ru and oxygen, the split layer can be composed of RU and an oxide. By sputtering using a target containing RU and an oxide, oxygen dissociated from the oxide is caused to be contained in the film, which results in achievement of a similar effect to oxygen addition.

It is particularly preferred that the oxide contained in the split layer is $WO_3$, $TiO_2$, or RuO. These oxides can improve the electromagnetic conversion characteristic (SNR). Among them, $WO_3$ can obtain a high effect. This is because $WO_3$ is an unstable oxide, and therefore exhibits the effect of oxygen addition more effectively by dissociating a large amount of oxygen during sputtering.

Then, the inventors have accumulated further studies, and have found that the above problem can be solved by connecting the first magnetic recording layer and the auxiliary recording layer by magnetic interaction, unlike the conventional manner in which the layers are respectively continuous with a main recording layer having a high SNR, and they have completed the present invention.

That is, in order to solve the above problem, a representative configuration of a perpendicular magnetic recording medium according to the present invention is characterized by including, on a base, at least a first magnetic layer having a granular structure in which a non-magnetic grain boundary portion is formed between crystal particles grown in a columnar shape; a first split layer disposed on the first magnetic layer; a second magnetic layer that is disposed on the first split layer and that has a granular structure in which a non-magnetic grain boundary portion is formed between crystal particles grown in a columnar shape; a second split layer that is disposed on the second magnetic layer; and a third magnetic layer that is disposed on the second split layer and that is magnetically approximately continuous in an in-plane direction of a main surface of the base.

The first or second split layer is interposed between the first magnetic layer (first magnetic recording layer) and the second magnetic layer (second magnetic recording layer) or between the second magnetic layer and the third magnetic layer (auxiliary recording layer), so that magnetic interaction can be caused to occur therebetween, and can be controlled. That is, by changing the film thicknesses of the split layers, antiferro-magnetic exchange coupling (AFC) is generated between the magnetic layers, or ferromagnetic exchange coupling (FC) is adjusted therebetween. By adjusting a coupling state or strength between the magnetic layers on and just below the split layer in this manner, fluctuation in magnetic axis can be reduced, or noise can be reduced.

In particular, the first split layer that is set to be relatively thicker (for example, 0.6 nm to 1.2 nm) can interrupt the magnetism between the first and second magnetic layers to generate AFC. Furthermore, in the first magnetic layer, by making the film thickness thereof thin, a height to width ratio of granular magnetic particles is also shortened, and therefore a diamagnetic field occurring inside the magnet is made intense. This makes an externally-directed magnetic moment of the first magnetic layer smaller, which can result in a magnetic layer that exerts a high coercive force but is reduced in noise.

On the other hand, the second split layer is set to be relatively thinner (for example, 0.2 nm to 0.6 nm). The second split layer is thinner than the first split layer, and the film thickness of the second split layer is in the range that does not cause AFC. This makes it possible to adjust the strength of exchange coupling between the first and second magnetic layers properly without interrupting the magnetism between them. This makes it possible to reduce the noise thought to be due to the third magnetic layer to improve the SNR. This is thought to be because exchange coupling between the auxiliary recording layer and the magnetic recording layer are moderately adjusted by providing the second split layer between the second magnetic layer and the third magnetic layer.

The first or second split layer may be composed of Ru or a Ru alloy. Since Ru has a crystalline form (hcp) similar to Co composing magnetic particles, Ru does not easily disturb epitaxial growth of Co crystal particles even if it is interposed between the magnetic layers.

The first or second spit layer may further contain oxygen or an oxide. In a portion of the split layer positioned above the grain boundary of the granular magnetic layer, by causing the split layer to contain Ru and oxygen, the oxygen atoms contained in the split layer inherits the grain boundary structure of the magnetic layer as a Ru oxide, since it has a high affinity for oxygen atoms contained in the grain boundary of the magnetic layer. Alternatively, when the split layer contains an oxide, the oxide has a high affinity for the grain boundary of the magnetic layer, and similarly inherits the grain boundary structure of the magnetic layer. Therefore, the split layer can cause Co in an upper layer to grow without disturbing the grain boundary structure of the magnetic layer.

The first or second spit layer may be RuO, $RuWO_3$, or $RuTiO_2$. There are various possible oxides, but in particular use of oxides of Ru, W (tungsten), Ti (titanium), can improve an electromagnetic conversion characteristic (SNR). Among them, $WO_3$ can obtain a high effect. This is because $WO_3$ is an unstable oxide, and therefore $WO_3$ dissociates a lot of oxygen during sputtering, and exhibits the effect of oxygen addition more effectively.

The thickness of the first or second split layer may be in the range of 2 Å to 10 Å. This is because, if the film thickness of the split layer is 10 Å or more, the magnetic layers on and just below the split layer are magnetically completely split to lose the inheritance of crystal orientation. Furthermore, if the film thickness becomes 10 Å or more, the exchange coupling occurring between the magnetic layers is weakened, and therefore it becomes impossible to obtain a desired SNR. On the other hand, that is also because, if the film thickness is 2 Å or less, the split layer cannot form a coating film.

The thickness of the first magnetic layer may be 5 nm or less. In this case, it is preferred that the first magnetic layer be a layer having a reduced amount of grain boundary portion and having a high coercive force Hc, and the second magnetic layer be a layer having a large amount of grain boundary portion and having a high SNR. This enhances the diamagnetic field of the first magnetic layer so that the magnetic field generated from the first magnetic layer can be reduced. Therefore, the noise generated from the first magnetic layer does not reach the magnetic head, and thus the coercive force Hc of the first magnetic layer can be increased by reducing the amount of oxide thereof so that the first magnetic layer can act as a pin layer that fixes the direction of magnetization of the second magnetic layer.

It is preferred that the film thickness of the first magnetic layer is in a range of 0.7 nm to 3.0 nm. This enhances the diamagnetic field of the first magnetic layer so that the noise due to the first magnetic layer can be reduced. Since the coercive force Hc can be increased by reducing the oxide in the first magnetic layer so that the first magnetic layer acts as a pin layer that fixes the direction of magnetization of the second magnetic layer, a high coercive force Hc can be achieved.

The oxide content of the first magnetic layer may be 5 mol % or more. This is because, when the oxide content is 5 mol % or more, a high coercive force Hc and a high SNR can be obtained.

The second magnetic layer may contain 5 mol % or more of oxide constituting the grain boundary. This is because, when the oxide is 5 mol % or more, a high magnetostatic characteristic and a high electromagnetic conversion characteristic can be obtained, and besides, though the characteristic of the third magnetic layer decreases considerably when the oxide content is in such a range, the characteristic can be improved by providing the split layer described above.

The second magnetic layer may contain two or more kinds of oxides. This makes it possible to obtain the characteristics of the plural oxides to achieve further refinement and isolation of the magnetic particles in the second magnetic layer to reduce the noise and improve the SNR, so that a perpendicular magnetic recording medium that can achieve a higher recording density can be obtained.

The second magnetic layer may contain one or plural oxides selected from a group consisting of $SiO_2$, $TiO_2$, and CoO. $SiO_2$ has the characteristic of promoting refinement and isolation of magnetic particles, and $TiO_2$ has the characteristic of improving the electromagnetic conversion characteristic (in particular, SNR). By segregating these oxides in combination to the grain boundary of the second magnetic layer, the perpendicular magnetic recording medium can enjoy the advantages of both the oxides.

Effect of the Invention

According to the present invention, it is possible to provide a perpendicular magnetic recording medium the SNR of which is further improved while a coercive force Hc thereof is secured so that a higher recording density can be achieved.

BRIEF DESCRIPTION OF THE DRAWINGS

FIG. 11 shows TEM photographs of the auxiliary recording layers of an example and a comparative example.

DESCRIPTION OF REFERENCE NUMERALS

Figure 1:
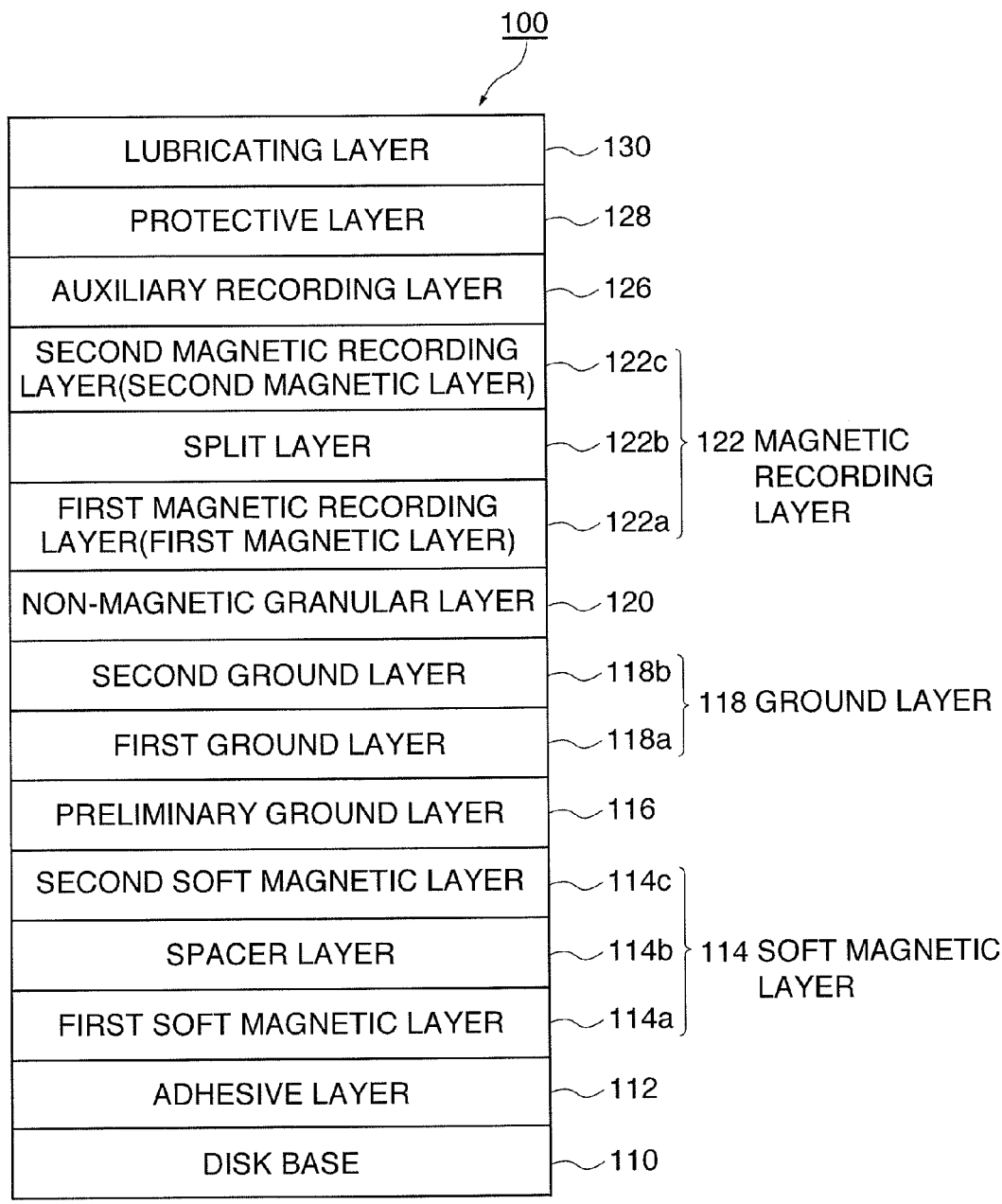
FIG. 1 is a diagram for describing the structure of a perpendicular magnetic recording medium according to an embodiment of the present invention.

100 . . . perpendicular magnetic recording medium
110 . . . disk base
112 . . . adhesion layer
114 . . . soft magnetic layer
114a . . . first soft magnetic layer
114b . . . spacer layer
114c . . . second soft magnetic layer
116 . . . preliminary ground layer
118 . . . ground layer
118a . . . first ground layer
118b . . . second ground layer
120 . . . non-magnetic granular layer
122 . . . magnetic recording layer
122a . . . first magnetic recording layer
122b . . . split layer (first split layer)
122c . . . second magnetic recording layer
124 . . . second split layer
126 . . . auxiliary recording layer
128 . . . medium protective layer
130 . . . lubricating layer

BEST MODE FOR CARRYING OUT THE INVENTION

In the following, with reference to the attached drawings, preferred embodiments of the present invention will be described in detail. The dimensions, materials, and others such as specific numerical values shown in the embodiments are merely examples so as to facilitate understanding of the invention, and are not meant to restrict the present invention unless otherwise specified. Note that, in the specification and drawings, components having substantially the same functions and structures are provided with the same reference numerals and are not redundantly described, and components not directly relating to the present invention are not shown in the drawings.

(First Embodiment)

In a first embodiment, first, an embodiment of a perpendicular magnetic recording medium according to the present invention will be described, and then a first magnetic layer, a second magnetic layer, and a split layer disposed between the first magnetic layer and the second magnetic layer will be described in detail.

[Perpendicular Magnetic Recording Medium]

FIG. 1 is a diagram for describing the structure of a perpendicular magnetic recording medium 100 according to this embodiment. The perpendicular magnetic recording medium 100 shown in FIG. 1 includes a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a (first magnetic layer), a split layer 122b, a second magnetic recording layer 122c (second magnetic layer), an auxiliary recording layer 126, a medium protecting layer 128, and a lubricating layer 130. Note that the first soft magnetic layer 114a, the spacer layer 114b, the second soft magnetic layer 114c together constitute a soft magnetic layer 114. The first ground layer 118a and the second ground layer 118b together constitute a ground layer 118. The first magnetic recording layer 112a, the split layer 122b, and the second magnetic recording layer 122c together constitute a magnetic recording layer 122.

As the disk base 110, a glass disk formed by molding an amorphous aluminosilicate glass in a disk form by direct pressing can be used. Note that the type, size, thickness, and others of the glass disk are not particularly restrictive. As a material of the glass disk, for example, an aluminosilicate glass, a soda lime glass, a soda aluminosilicate glass, an aluminoborosilicate glass, a borosilicate glass, a quartz glass, a chain silicate glass, or a glass ceramic, such as a crystallized glass, is used. On this glass disk, grinding, polishing, and chemical strengthening are sequentially performed, and the smooth non-magnetic disk base 110 formed of the chemically-strengthened glass disk can be obtained.

On the disk base 110, the adhesion layer 112 to the auxiliary recording layer 126 are sequentially formed by DC magnetron sputtering, and the medium protective layer 128 can be formed by CVD. Then, the lubricating layer 130 can be formed by dip coating. Note that it is also preferred to use an inline-type film forming method in view of high productivity. The structure of each layer is described below.

The adhesion layer 112 is formed in contact with the disk base 110, including a function of increasing delamination strength between the soft magnetic layer 114 formed on the adhesion layer and the disk base 110 and a function of refining and homogenizing crystal grains of each layer formed on the soft magnetic layer 114. When the disk base 110 is made of an amorphous glass, it is preferred that the adhesion layer 112 be an amorphous alloy film so as to adapt to the surface of the amorphous glass.

As the adhesion layer 112, for example, it can be selected from a group of a CrTi-type amorphous layer, a CoW-type amorphous layer, a CrW-type amorphous layer, a CrTa-type amorphous layer, and a CrNb-type amorphous layer. The adhesion layer 112 may be a monolayer formed of a single material, or may be formed by laminating a plurality of layers.

The soft magnetic layer 114 is a layer for temporarily forming a magnetic path at recording time in order to let a magnetic flux pass through the recording layer in a perpendicular direction in the perpendicular magnetic recording type. The soft magnetic layer 114 can be configured to include AFC by interposing the non-magnetic spacer layer 114b between the first soft magnetic layer 114a and the second soft magnetic layer 114c. With this, the magnetizing direction of the soft magnetic layer 114 can be aligned with high accuracy along the magnetic path (a magnetic circuit). With this, perpendicular components in the magnetizing direction are extremely decreased, thereby reducing noise occurring from the soft magnetic layer 114. As the compositions of the first soft magnetic layer 114a and the second soft magnetic layer 114c, a cobalt-type alloy, such as a CoTaZr; a Co—Fe—type alloy, such as CoCrFeB or CoFeTaZr; or a Ni—Fe—type alloy, such as a [Ni—Fe/Sn]n multilayered structure can be used.

The preliminary ground layer 116 is a non-magnetic alloy layer, including an operation of protecting the soft magnetic layer 114 and a function of orienting an axis of easy magnetization of a hexagonal close-packed structure (hcp structure) contained in the ground layer 118 formed on the preliminary ground layer 116 in a direction perpendicular to the disk. It is preferred that the preliminary ground layer 116 have a (111) plane of a face-centered cubic structure (fcc structure) parallel to a main surface of the disk base 110. The preliminary ground layer 116 may also be configured to have these crystal structures and an amorphous structure in a mixed manner. As a material of the preliminary ground layer 116, it can be selected from a group of Ni, Cu, Pt, Pd, Zr, Hf, Nb, and Ta. Further, an alloy that contains these metals as a main component and that contains any one of Ti, V, Cr, Mo, and W as an additive element may be selected. For example, as an alloy having an fcc structure, NiW, CuW, or CuCr can be preferred to be selected.

The ground layer 118 has an hcp structure, and has an operation of growing a crystal with an hcp structure of Co in the magnetic recording layer 122 as a granular structure. Therefore, the orientation of the magnetic recording layer 122 can be more improved as the crystalline orientation of the ground layer 118 becomes higher, that is, as a (0001) surface of the crystal of the ground layer 118 becomes more parallel to the main surface of a disk base 110. A typical material of the ground layer 118 is Ru, though the material can be selected from RuCr and RuCo instead. Because Ru has an hcp structure and has crystal lattice spacing close to that of Co, the magnetic recording layer 122 containing Co as a main component can be well oriented.

When Ru is used for the ground layer 118, by changing gas pressure at sputtering, a two-layer structure made of Ru can be formed. Specifically, Ar gas pressure is set at a predetermine pressure, namely, a low pressure when the first ground layer 118a on the bottom side is formed, and the Ar gas pressure is set at a pressure higher than when the first ground layer 118a on the bottom side is formed, namely, a high pressure when the second ground layer 118b on the top side is formed. This makes it possible for the first ground layer 118a to improve in crystalline orientation of the magnetic recording layer 122 and for the second ground layer 118b to refine a particle diameter of a magnetic particle of the magnetic recording layer 122.

Further, as the gas pressure increases, an average free path of plasma ions to be sputtered becomes shorter, and thus a film formation speed becomes slower and a coating film becomes rougher, and therefore it is possible to promote separation and refinement of the crystal particles of Ru, and also it becomes possible to refine the crystal particles of Co.

Furthermore, a small amount of oxygen may be contained in Ru of the ground layer 118. This makes it possible to promote further separation and refinement of the crystal particles of Ru, and to achieve further isolation and refinement of the magnetic recording layer 122. Note that although oxygen may be caused to be contained by reactive sputter, it is preferred that a target containing oxygen be used at film formation by sputtering.

The non-magnetic granular layer 120 is a non-magnetic layer having a granular structure. On the hcp crystal structure of the ground layer 118, the non-magnetic granular layer is formed, on which a granular layer of the first magnetic recording layer 122a (or the magnetic recording layer 122) is grown. With this, the magnetic granular layer has an operation of separating the magnetic granular layer from a stage of initial growth (start-up). This makes it possible to promote isolation of the magnetic particles of the magnetic recording layer 122. The composition of the non-magnetic granular layer 120 can have a granular structure by subjecting a non-magnetic substance to segregation between non-magnetic crystal particles made of a Co-type alloy to form a grain boundary.

In this embodiment, CoCr—$SiO_2$ is used for this non-magnetic granular layer 120. This causes the non-magnetic granular layer 120 to have a granular structure because $SiO_2$ (non-magnetic substance) is subjected to segregation between the Co-type alloys (non-magnetic crystal particles) to form a grain boundary. Note that CoCr—$SiO_2$ is merely an example, and is not meant to be restrictive. Alternatively, CoCrRu$SiO_2$ can be preferred to be used, and, in place of Ru, Rh (rhodium), Pd (palladium), Ag (silver), Os (osmium), Ir (iridium), or Au (gold) can also be used. Still further, the non-magnetic substance can be any non-magnetic substance that can form a grain boundary portion around magnetic particles so as to suppress or interrupt an exchange interaction operation between the magnetic particles (magnetic grains), and that does not allow solid solution with cobalt (Co). Examples can include silicon oxide ($SiO_x$), chromium (Cr), chromium oxide ($Cr_2O_2$), titanium oxide ($TiO_2$), zircon oxide ($ZrO_2$), and tantalum oxide ($Ta_2O_5$).

In this embodiment, the non-magnetic granular layer 120 is provided on the ground layer 188 (the second ground layer 188b). This is not meant to be restrictive, and the perpendicular magnetic recording medium 100 can be configured without the non-magnetic granular layer 120.

The magnetic recording layer 122 has a granular structure in a columnar shape in which a non-magnetic substance is subjected to segregation around magnetic particles of a hard magnetic substance selected from a group consisting of a Co-type alloy, a Fe-type alloy, and a Ni-type alloy to form a ground boundary. By providing the non-magnetic granular layer 120, these magnetic particles can epitaxially grow continuously from the granular structure.

The magnetic recording layer 122 comprises the first magnetic recording layer 122a and the second magnetic recording layer 122c, different in composition and film thickness from each other in this embodiment, and the split layer 122b provided therebetween. This makes it possible for fine crystal particles of the second magnetic recording layer 122c to grow continuously from crystal particles of the first magnetic recording layer 122a, so that refinement of the second magnetic recording layer 122c serving as a main recording layer can be achieved and the SNR can be improved.

In this embodiment, CoCrPt—$Cr_2O_3$ is used for the first magnetic recording layer 112a. CoCrPt—$Cr_2O_3$ forms a granular structure in which Cr and $Cr_2O_3$ (oxides), which are non-magnetic substances, are subjected to segregation around magnetic particles (grains) made of CoCrPt to form a ground boundary and the magnetic particles are grown in a columnar shape. The magnetic particles are epitaxially grown continuously from the granular structure of the non-magnetic granular layer.

The split layer 122b is a non-magnetic thin film composed of Ru, which is interposed between the first magnetic recording layer 122a and the second magnetic recording layer 122c to split ferromagnetic continuity between these magnetic recording layers 122. Therefore, antiferro-magnetic exchange coupling (AFC) is generated between these magnetic recording layers 122. This makes the direction of magnetization antiparallel between the magnetic recording layers 122 (the first magnetic recording layer 122a and the second magnetic recording layer 122c) on and just below the split layer 122b, which can reduce noise.

Further, CoCrPt—$SiO_2$—$TiO_2$ is used for the second magnetic recording layer 122c. Also in the second magnetic recording layer 122c, a granular structure is formed in which Cr, $SiO_2$ and $TiO_2$ (composite oxide), which are non-magnetic substances, are subjected to segregation around magnetic particles (grains) made of CoCrPt to form a ground boundary and the magnetic particles are grown in a columnar shape.

Note that the substances for use in the first magnetic recording layer 122a and the second magnetic recording layer 122c described above are merely examples, and are not meant to be restrictive. In this embodiment, the materials (targets) of the first magnetic recoding layer 122a and the second magnetic recording layer 122c are different from each other, but not limited to this, and the materials thereof may be of the same composition or type as each other. A non-magnetic substance for forming a non-magnetic region may be, for example, an oxide such as a silicon oxide ($SiO_x$), chromium (Cr), chromium oxide ($Cr_xO_y$), titanium oxide ($TiO_2$), zircon oxide ($ZrO_2$), tantalum oxide ($Ta_2O_5$), cobalt oxide ($CoO_2$ or $Co_3O_4$), iron oxide ($Fe_2O_3$), or boron oxide ($B_2O_3$). Also, a nitride, such as BN, and a carbide, such as $B_4C_3$, can be suitably used.

Furthermore, in this embodiment, one type of non-magnetic substance (oxide) is used in the first magnetic recording layer 122a, and two types thereof are used in the second magnetic recording layer 122c, but this is not meant to be restrictive, and it is also possible to use two or more types of non-magnetic substances in combination in either or both of the first magnetic recording layer 122a and the second magnetic recording layer 122c. Here, although the types of non-magnetic substances contained are not limited, it is preferred that $SiO_2$ and $TiO_2$ are particularly contained in this embodiment. Therefore, unlike this embodiment, when the magnetic recording layer 122 is composed of a single layer, it is preferred that this magnetic recording layer 122 be made of CoCrPt—$SiO_2$—$TiO_2$.

The auxiliary recording layer 126 is a magnetic layer magnetically approximately continuing in an in-plane direction of the main surface of the base. The auxiliary recording layer 126 is required to be adjacent or close to the magnetic recording layer 122 so as to have a magnetic interaction therewith. A material of the auxiliary recording layer 126 may be, for example, CoCrPt or CoCrPtB, or can be composed of any of these materials containing a slight amount of oxide. The auxiliary recording layer 126 is aimed at adjusting a reversed magnetic domain nucleation magnetic field Hn and adjusting the coercive force Hc, thereby achieving improvement in resistance to heat fluctuations, OW characteristic, and SNR. To achieve this aim, it is desired that the auxiliary recording layer 126 have high perpendicular magnetic anisotropy Ku and saturation magnetization Ms. Note that, though the auxiliary recording layer 126 is disposed above the magnetic recording layer 122 in this embodiment, it may be disposed therebelow.

Note that "magnetically continuing" means that magnetization continues. "Approximately continuing" means that the auxiliary recording layer 126 is not necessarily a single magnet when observed as a whole and the magnetism may be discontinued due to the grain boundary of the crystal particles and others. In the grain boundary, the crystal may be not only discontinuous but also Cr may be subjected to segregation. Furthermore, a slight amount of oxide may be contained for segregation. However, even when a grain boundary containing an oxide is formed in the auxiliary recording layer 126, it is preferred that the area (amount of oxide content) of the grain boundary is smaller than that of the ground boundary of the magnetic recording layer 122. Though the function and operation of the auxiliary recording layer 126 are not necessarily clear, it is thought that the auxiliary recording layer 126 has a magnetic interaction (performs exchange coupling) with the granular magnetic particles of the magnetic recording layer 122, thereby adjusting Hn and Hc and improving resistance to heat fluctuations and the SNR. It is also thought that, because the area of the crystal particles connected to the granular magnetic particles (crystal particles having a magnetic interaction) is larger than the cross-section of the granular magnetic particles, the auxiliary recording layer 126 receives more magnetic fluxes from a magnetic head to become prone to magnetization reversal, thereby improving an overall OW characteristic.

The medium protective layer 128 can be formed by forming a film of carbon by CVD with vacuum being kept. The medium protective layer 128 is a layer for protecting the perpendicular magnetic recording medium 100 from an impact of the magnetic head. In general, a carbon film formed by CVD has a film hardness improved as compared with those formed by sputtering, and therefore the perpendicular magnetic recording medium 100 can be effectively protected from an impact from the magnetic head.

The lubricating layer 130 can be formed by dip coating with the use of PFPE (perfluoropolyether). PFPE has a long-chain-shaped molecular structure, and combines with N atoms on the surface of the medium protective layer 128 with high affinity. With this operation of the lubricating layer 130, even when the magnetic head comes into contact with the surface of the perpendicular magnetic recording medium 100, damage and loss of the medium protective layer 128 can be prevented.

According to the above manufacturing process, the perpendicular magnetic recording medium 100 can be obtained. Next, the magnetic recording layer 122 (the first magnetic recording layer 122a, the second magnetic recording layer 122c, and the split layer 122b provided therebetween), which is a feature of the present invention, will be described in further detail.

As described above, the split layer 122b is a non-magnetic layer provided between the first magnetic recording layer 122a and the second magnetic recording layer 122c. This splits ferromagnetic continuity between these magnetic recording layers 122, and antiferro-magnetic exchange coupling (AFC) is generated between the magnetic recording layers 122 as a magnetic effect.

Figure 2:
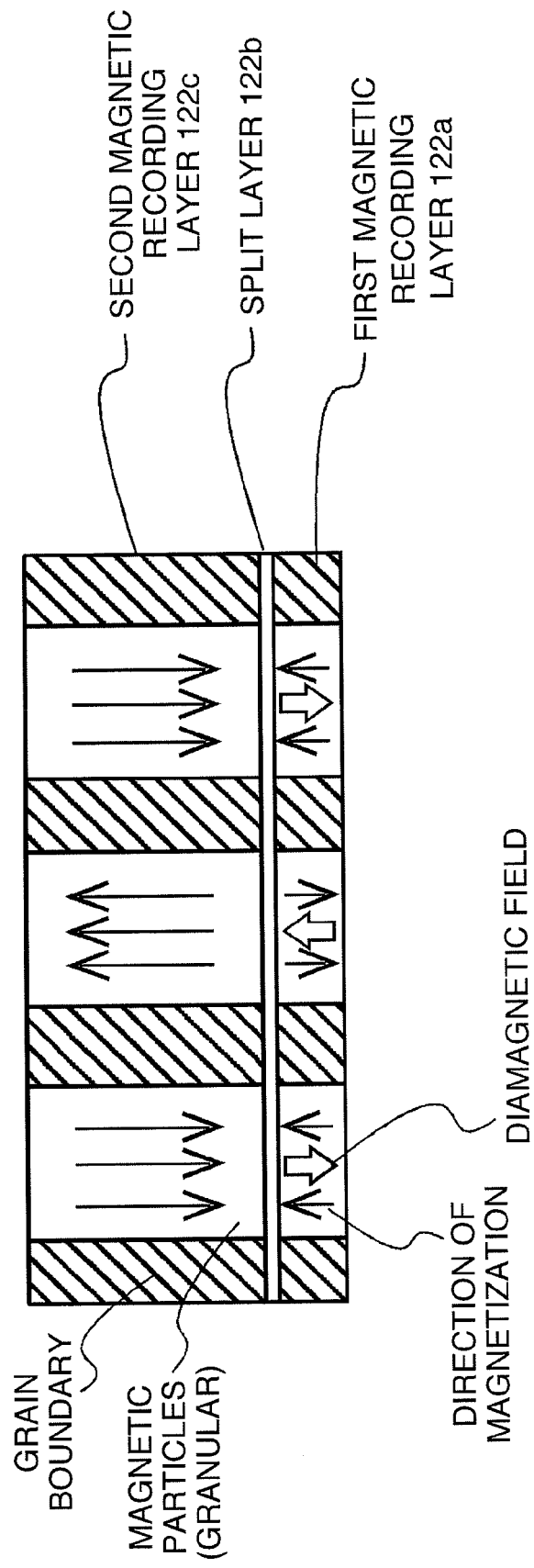
FIG. 2 is a diagram for describing a model of a magnetic coupling composed of a first magnetic recording layer, a split layer, and a second magnetic recording layer.

FIG. 2 is a diagram for describing a model of a magnetic coupling composed of the first magnetic recording layer 122a, the split layer 122b, and the second magnetic recording layer 122c. As shown in FIG. 2, by providing the split layer 122b between the first magnetic recording layer 112a and the second magnetic recording layer 122c, antiferro-magnetic exchange coupling (AFC) is caused therebetween, the directions of magnetization of the first magnetic recording layer 112a and the second magnetic recording layer 122c are made antiparallel, which interacts so as to fix the directions of magnetization. Therefore, noise can be reduced.

Furthermore, as shown in FIG. 2, it is preferred that the thickness of the first magnetic recording layer 122a is smaller than that of the second magnetic recording layer 122c, and it is more preferred that the film thickness of the first magnetic recording layer 122a is in the range of 0.7 nm to 3.0 nm.

Without the split layer 122b, the first magnetic recording layer 122a would be a magnet continuous with the second magnetic recording layer 122c, but here, since the split layer 122b splits them, the first magnetic recording layer 122a constitutes an individual short magnet. Then, by further reducing the film thickness of the first magnetic recording layer 122a, a height to width ratio of the granular magnetic particles is reduced (in the perpendicular magnetic recording medium, a direction along the film thickness corresponds to a longitudinal direction of an axis of easy magnetization), and thus a diamagnetic field occurring inside the magnet becomes intense. Therefore, a magnetic field generated outward from the first magnetic recording layer 122a becomes too weak to be easily sensed by the magnetic head. That is, by adjusting the film thickness of the first magnetic recording layer 122a to set the magnetic moment (strength of a magnet) such that the magnetic field does not easily reach the magnetic head and such that the first magnetic recording layer 122a magnetically interacts with the second magnetic recording layer 122c, the magnetic recording layer 122 that exerts a high coercive force but is reduced in noise can be obtained.

Furthermore, since noise generated from the first magnetic recording layer 122a does not reach the magnetic head, the amount of oxide of the first magnetic recording layer 122a can be reduced to increase the coercive force Hc, and besides, the first magnetic recording layer 122a can be caused to act as a pin layer that fixes the direction of magnetization of the second magnetic recording layer 122c.

It is preferred that the split layer 122b have a film thickness in the range of 2 Å to 10 Å (0.2 nm to 1 nm). This makes it possible to interrupt magnetism between the first magnetic recording layer 122a and the second magnetic recording layer 122c to generate AFC. Here, if the film thickness of the split layer 122b is set at 10 Å or more, the exchange coupling generated between the magnetic recording layers 122 is weakened, and therefore it becomes impossible to obtain a desired SNR, and besides, the magnetic recording layers 122 on and just below the split layer 122b are magnetically completely separated from each other and inheritance of crystal orientation from one to the other is lost. On the other hand, if the film thickness of the split layer 122b is 2 Å or less, the magnetism between the first magnetic recording layer 122a and the second magnetic recording layer 122c cannot be interrupt, and therefore it becomes impossible to generate AFC, and besides, the split layer 122b cannot form a coating film. Note that, because the strength of exchange coupling of AFC attenuates while fluctuating according to the thickness of the intervening split layer 122b, it is preferred that the film thickness is set so as to obtain the peak of the fluctuation.

Furthermore, in terms of the crystal structure, the first magnetic recording layer 122a and the second magnetic recording layer 122c have similar granular structures, and therefore the inheritance of the crystalline orientation between them is not blocked. Because the split layer 122b does not contain so much as oxygen as the magnetic recording layers 122 (the first magnetic recording layer 122a and the second magnetic recording layer 122c), no grain boundary is formed in the split layer 122b, but it is thought that the split layer 122b does not disturb crystal growth, since the split layer 122b is an extremely thin film with a thickness of 1 nm or less and Ru constituting the split layer 122b has an hcp structure as described later.

Hereinabove, the advantages of the film configuration of the magnetic recording layer 122 have been described. Next, the compositions of the first magnetic recording layer 122a, the second magnetic recording layer 122c, and the split layer 122b will be described in detail.

The first magnetic recording layer 122a and the second magnetic recording layer 122c are layers each of which has a granular structure in which a non-magnetic grain boundary portion is formed between crystal particles grown in a columnar shape, and they contain oxides as a substance to form the grain boundary portion. Here, when an oxide content of the first magnetic recording layer 122a is represented by A, and an oxide content of the second magnetic recording layer 122c is represented by B, it is preferred that a relationship between the oxide contents A/B is in the range of $0.5 < A/B < 1.0$.

This makes it possible to further improve the SNR of the perpendicular magnetic recording medium while keeping a high coercive force Hc thereof, since the first magnetic recording layer 122a becomes a layer having a small amount of grain boundary portion and having a high coercive force Hc, and the second magnetic recording layer 122c becomes a layer having a large amount of grain boundary portion and having a high SNR. In addition, since the first magnetic recording layer 122a has a high coercive force, the first magnetic recording layer 122a can act as a pin layer that fixes the direction of magnetization of the second magnetic recording layer 122c.

Note that it is preferred that an amount of oxide contained in the first magnetic recording layer 122a is 5 mol % or more, because this makes it possible to obtain a high coercive force Hc and a high SNR.

It is also preferred that two or more kinds of oxides are contained in the second magnetic recording layer 122c. This makes it possible to obtain plural oxide characteristics, thereby achieving further refinement and isolation of the magnetic particles of the second magnetic recording layer 122c to reduce noise and improve the SNR, so that a higher recording density of the perpendicular magnetic recording medium 100 can be achieved.

Above all, it is preferred that one or plural oxides contained in the second magnetic recording layer 122c are selected from a group consisting of $SiO_2$, $TiO_2$, and CoO. $SiO_2$ has the characteristic of promoting refinement and isolation of magnetic particles, and $TiO_2$ has the characteristic of achieving improvement in electromagnetic conversion characteristic (in particular, SNR). Therefore, by causing these oxides in combination to segregate to the grain boundary of the second magnetic recording layer 122c, the perpendicular magnetic recording medium 100 can enjoy the advantages of both the oxides.

It is preferred that the split layer 122b is composed of Ru or a Ru alloy. Because Ru is close in lattice constant to Co constituting the magnetic particles, and Ru has a similar crystalline structure (hcp) to Co constituting the magnetic particles, the split layer composed of Ru does not easily disturb epitaxial growth of Co crystal particles even if it is interposed between the magnetic recording layers 122.

Note that it is preferred that the Ru alloy is selected from a group consisting of RuO, RuCo, RuCr, $RuSiO_2$, $RuTiO_2$, $RuCr_2O_3$, $RuWO_3$, and $RuTa_2O_5$. This is because these Ru alloys are most effective in securing a high coercive force Hc and improving the SNR.

EXAMPLES

The adhesion layer 112 to the auxiliary recording layer 126 were sequentially formed on the disk base 110 in an Ar atmosphere by DC magnetron sputtering using an apparatus for film formation that was subjected to vacuuming. The adhesion layer 112 was composed of CrTi. Regarding the soft magnetic layer 114, the respective compositions of the first soft magnetic layer 114a and the second soft magnetic layer 114c were CoCrTaZr, and the composition of the spacer layer 114b was Ru. The composition of the preliminary ground layer 116 was a NiW alloy having an fcc structure. As the first ground layer 118a, a Ru film was formed under an Ar atmosphere at a predetermined pressure (low pressure: for example, 0.6 to 0.7 Pa). As the second ground layer 118b, a Ru film containing oxygen was formed under an Ar atmosphere at a higher pressure than the predetermined pressure (high pressure: for example, 4.5 to 7 Pa) by using a target containing oxygen. The composition of the non-magnetic granular layer 120 was non-magnetic CoCr—$SiO_2$. The second magnetic recording layer 122c was caused to contain $SiO_2$ and $TiO_2$ as an example of a composite oxide (plural kinds of oxides) at the grain boundary portion to form the hcp crystal structure of CoCrPt—$SiO_2$—$TiO_2$. Regarding the first magnetic recording layer 122a and the split layer 122b, the following examples and comparative examples that were different in film thickness and composition thereof were produced. The composition of the auxiliary recording layer 126 was CoCrPtB. The medium protecting layer 128 was formed by CVD method using $C_2H_4$ and CN, and the lubricating layer 130 was formed by dip coating using PFPE.

Figure 3:
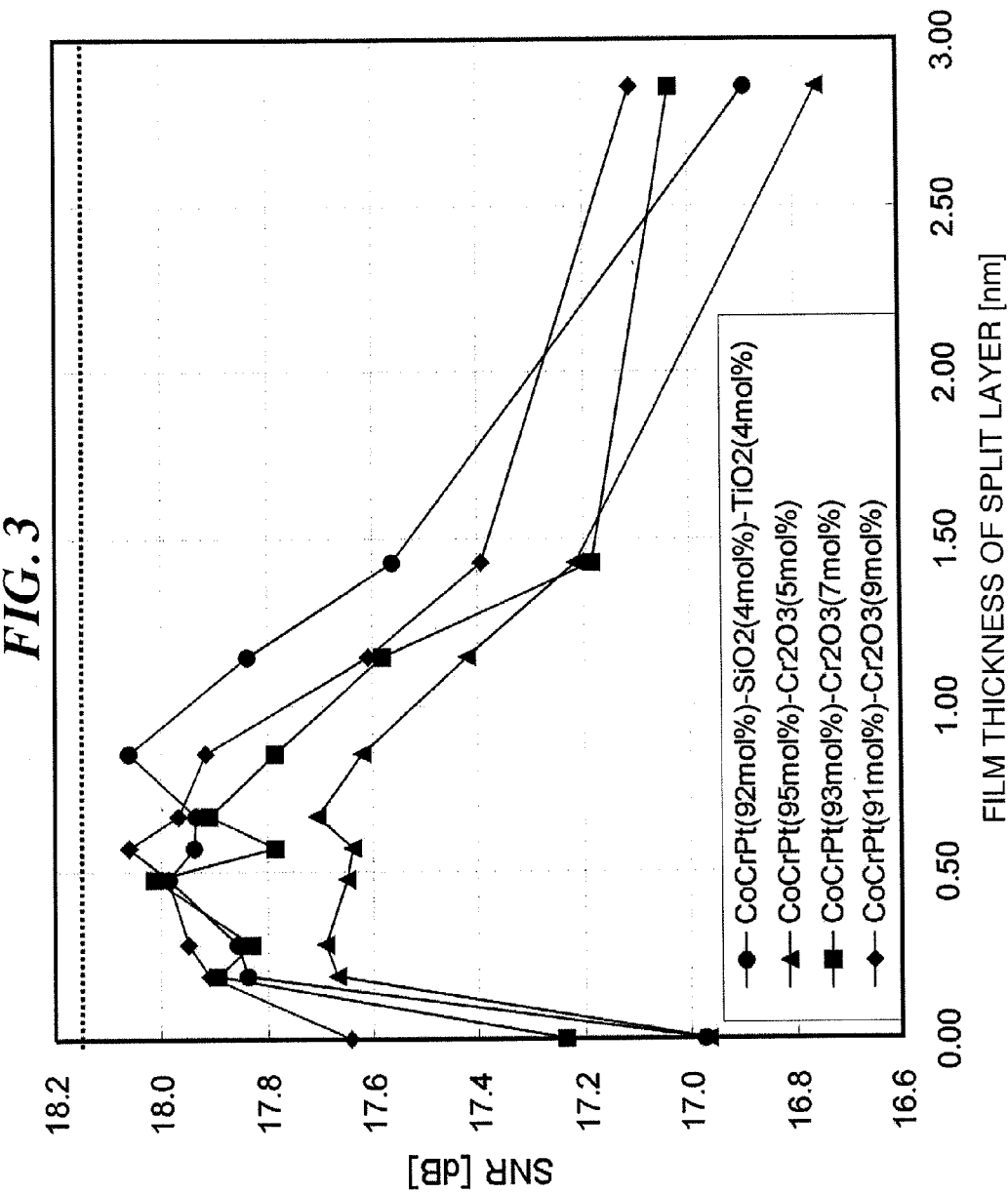
FIG. 3 is a graph showing a relationship between the film thickness of the split layer and SNR.

FIG. 3 is a graph showing the relationship between the film thickness of the split layer 122b and the SNR. The composition of the split layer 122b was Ru in all the cases. In FIG. 3, the name of a substance attached to each line represents the composition of the first magnetic recording layer 122a.

As shown in FIG. 3, in each line, as the film thickness of the split layer 122b increases from a state where the split layer 122b is not provided, that is, 0 nm, the SNR remarkably increases. Then, once the film thickness of the split layer 122b exceeds 1 nm (10 Å), the SNR starts to decrease. When the film thickness reaches 3 nm, the SNR becomes a value lower than in the case where the split layer 122b is not provided.

Because a desired SNR to achieve a higher recording density of the perpendicular magnetic recording medium 100 is 17.5 dB or more, it can be understood from FIG. 3 that it is preferred that the film thickness of the split layer 122b is in the range of 0.2 nm to 1.0 nm (2 Å to 10 Å). From this, it is thought that antiferro-magnetic exchange coupling (AFC), which was magnetic interaction, was generated between the first magnetic recording layer 122a and the second magnetic recording layer 122c, and the direction of magnetization of the first magnetic recording layer 122a and the direction of magnetization of the second magnetic recording layer 122c were arranged antiparallel to each other and fixed to reduce noise and consequently improve the SNR.

Incidentally, it is thought that the reason why improvement in SNR to a desired value could not be achieved when the thickness of the split layer 122b was less than 0.2 nm was because the split layer 122b could not interrupt the magnetism between the first magnetic recording layer 122a and the second magnetic recording layer 122c, and could not generate AFC. Also, it is considered that the reason why a desired SNR could not be obtained when the film thickness of the split layer 122b was more than 1.0 nm was because AFC generated between the magnetic recording layers 122 became weak, so that the function of arranging the directions of magnetization of the magnetic recording layers 122 (the first magnetic recording layer 122a and the second magnetic recording layer 122c) or fixing them was reduced and the desired SNR could not be obtained.

Furthermore, in FIG. 3, focusing on the oxide contained in the first magnetic recording layer 122a, the four lines can be roughly classified into one line containing $SiO_2$ (4 mol %) and $TiO_2$ (4 mol %) as oxides and the other three lines containing $Cr_2O_3$. Then, from comparison between the line containing $SiO_2$ and $TiO_2$ and the lines containing $Cr_2O_3$, it can be seen that all the lines show almost the same tendency to improve the SNR when the split layer 122b is provided and reduce the SNR when the film thickness of the split layer 122b becomes excessively thick. From this, it can be understood that the SNR can be improved regardless of the kind of oxide by optimizing the film thickness of the split layer 122b.

Furthermore, focusing on only the lines containing $Cr_2O_3$, it can be seen that, as the oxide content of the first magnetic recording layer 122a increases from 5 mol % to 7 mol % and further to 9 mol %, the SNR further improves. From this, it is thought that, since the oxide content of the first magnetic recording layer 122a increased, the amount of a substance that formed the grain boundary of the magnetic particles in a columnar shape, namely, a grain boundary portion, in the first magnetic recording layer 122a increased, and consequently the column of the magnetic particles became thinner.

Figure 4:
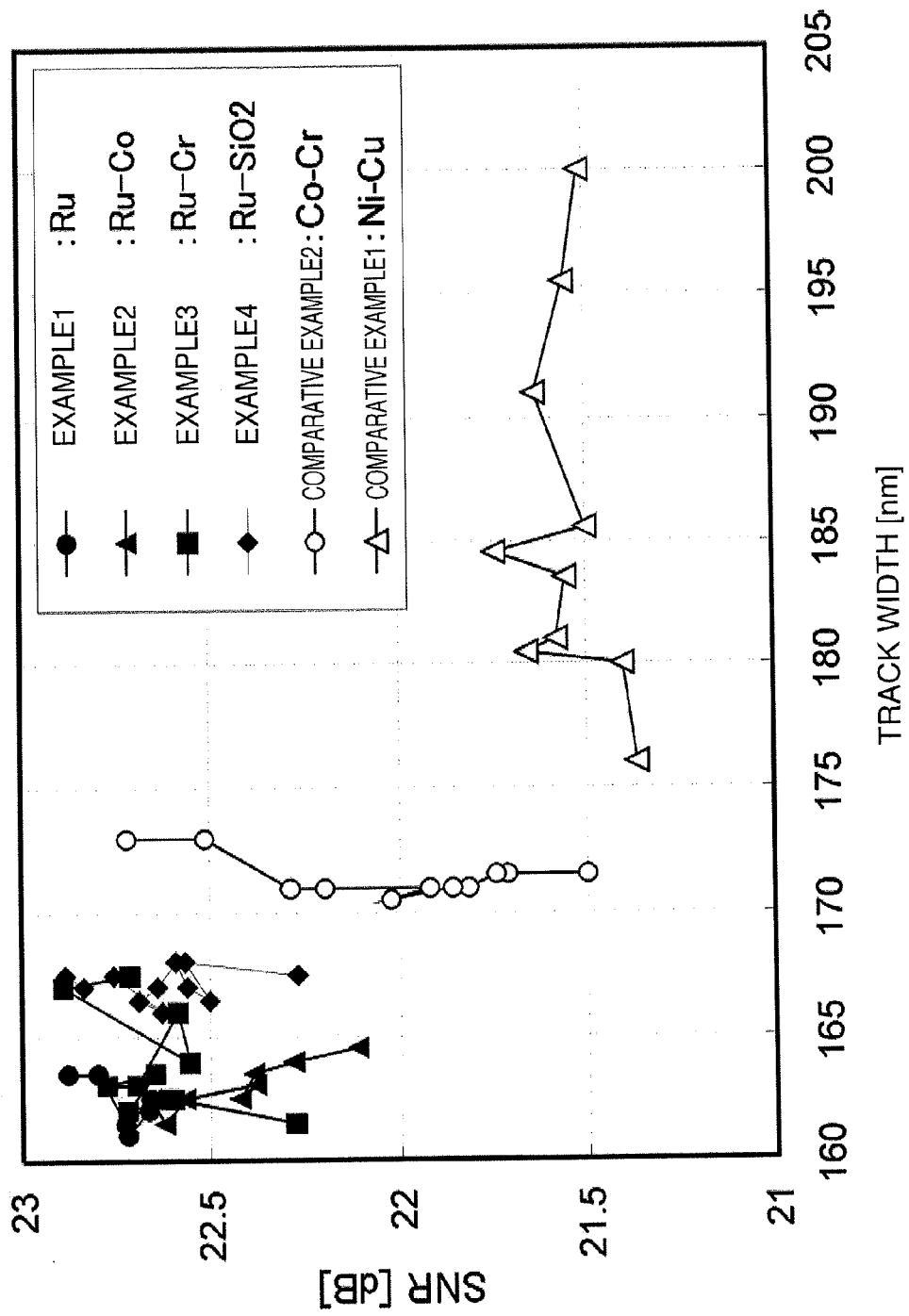
FIG. 4 is a graph showing a relationship between the composition of the split layer, the SNR, and a track width.

FIG. 4 is a graph showing the relationship between the composition of the split layer 122b, the SNR, and the track width. Here, the composition of the split layer 122b is Ru in an example 1, RuCo in an example 2, RuCr in an example 3, $RuSiO_2$ in an example 4, Co—Cr in a comparative example 1, and Ni—Cu in a comparative example 2. RuCo, RuCr, and $RuSiO_2$ are Ru alloys. The film thickness of the split layer 122b is 7 Å in all the cases. Note that the track width mentioned above is not an actual track width of the perpendicular magnetic recording medium 100 but a track width that a track profile obtained in a recordable width test shows a predetermined ratio.

As shown in FIG. 4, the examples and the comparative examples exceed the SNR value of 17.5 dB desired for achievement of a high recording density. However, in comparison between the examples and the comparative examples, it can be seen that the examples in which the split layer 122b is composed of Ru or a Ru alloy achieve higher SNRs than the comparative examples. Therefore, it can be seen that it is preferred that Ru or a Ru alloy is used for the split layer 122b in order to achieve a higher recording density.

The track widths of the examples are also narrower than those of the comparative examples. From this, it can also be seen that using Ru or a Ru alloy for the split layer makes it possible to make the track width narrower so that a higher recording density can be achieved.

Figure 5:
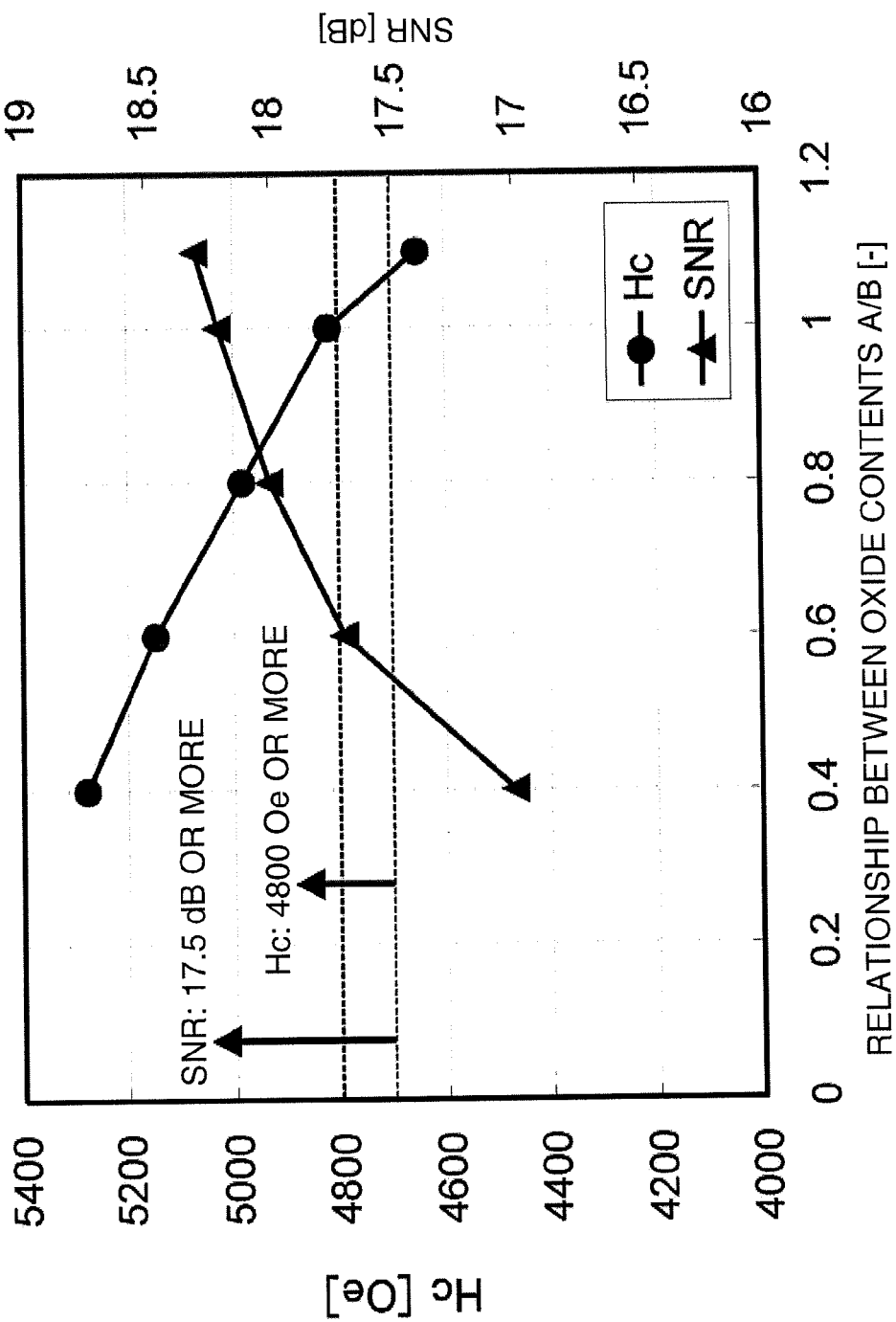
FIG. 5 is a graph showing a relationship between the relationship A/B between the oxide contents of the first and second magnetic recording layers, the SNR, and a coercive force Hc.

FIG. 5 is a graph showing the relationship between the relationship A/B between the oxide contents of the magnetic recording layers 122, the SNR, and the coercive force Hc. Note that a higher absolute value of the coercive force Hc is better, and therefore the absolute value of the coercive force Hc is shown in the graph. The composition of the split layer 122b was Ru and the film thickness thereof was 7 Å in all the cases.

As shown in FIG. 5, as A/B increases, the SNR further improves, but the coercive force Hc decreases. This proves once again that the coercive force Hc and the SNR are in a trade-off relationship. However, by setting A/B in the range of 0.5<A/B<1.0, the two requirements for achievement of a high recording density which are the SNR of 17.5 dB or more and the coercive force Hc of 4800 Oe or more can be satisfied. Therefore, it becomes possible to further improve the SNR while securing a high coercive force Hc so that a higher recording density can be achieved.

Figure 6:
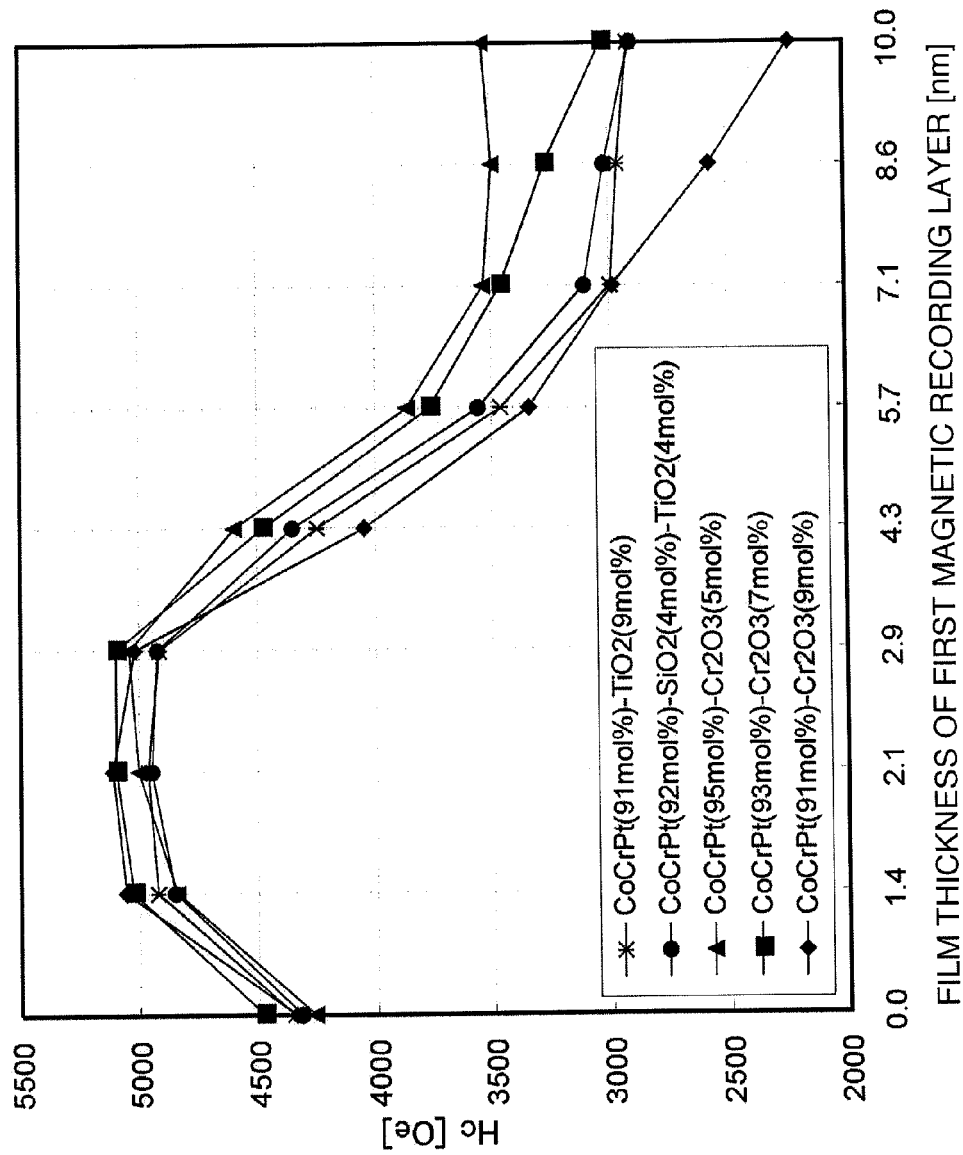
FIG. 6 is a graph showing the relationship between the film thickness of the first magnetic recording layer and the coercive force Hc.

FIG. 6 is a graph showing the relationship between the film thickness of the first magnetic recording layer 122a and the coercive force Hc. In FIG. 6, also, the coercive force Hc is shown as the absolute value thereof in the graph. In FIG. 6, the name of a substance attached to each line represents the composition of the first magnetic recording layer 122a. The composition of the split layer 122b was Ru in all the cases, and the film thickness thereof was 7 Å.

As shown in FIG. 6, in all the lines, as the film thickness of the first magnetic recording layer 122a increases, the coercive force Hc further improves. Then, the coercive force Hc starts to decrease when the film thickness of the first magnetic recording layer 122a exceeds about 3 nm, and the coercive force Hc becomes lower than in a case where the first magnetic recording layer 122a is not provided, when the film thickness reaches about 4 nm.

Since the coercive force Hc required for a perpendicular magnetic recording medium is 4800 Oe or more, it can be seen from FIG. 6 that it is preferred that the film thickness of the first magnetic recording layer 122a is in the range of 0.7 nm to 3.0 nm. This makes it possible to achieve a higher recording density of the perpendicular magnetic recording medium 100 while securing a high coercive force Hc. Since the first magnetic recording layer 122a has a high coercive force Hc, the first magnetic recording layer 122a can act as a pin layer that fixes the direction of magnetization of the second magnetic recording layer 122c.

Furthermore, focusing on the oxide contained in the first magnetic recording layer 122c in FIG. 6, the five lines can be roughly classified into one line containing $TiO_2$ (9 mol %) as an oxide, another line containing $SiO_2$ (4 mol %) and $TiO_2$ (4 mol %), and the other three lines containing $Cr_2O_3$. Then, from comparison between the above lines, it can be seen that all the lines show a tendency to improve the coercive force Hc further as the film thickness of the first magnetic recording layer 122a increases, and start to reduce the coercive force Hc when the film thickness becomes excessively thick. This shows that a high coercive force Hc can be secured regardless of the kind of oxide by optimizing the film thickness of the first magnetic recording layer 122a.

As described above, according to the present invention, since the magnetic recording layer 122 is composed of the first magnetic recording layer 122a, the split layer 122b, and the second magnetic recording layer 122c, and the film thickness and composition of each layer are optimized, the SNR can be further improved while a high coercive force Hc is secured. This makes it possible to achieve a higher recording density of the perpendicular magnetic recording medium 100.

(Second Embodiment)

A second embodiment of the perpendicular magnetic recording medium according to the present invention will be described. Components overlapping with the first embodiment are denoted by the same reference numerals and not repeatedly described.

In the first embodiment, the structure in which the split layer 122b is provided between the first magnetic recording layer 122a and the second magnetic recording layer 122c has been described. On the other hand, in the second embodiment, a structure in which a second split layer 124 is additionally provided between the second magnetic recording layer 122c and the auxiliary recording layer 126 will be described. In the following description, the split layer 122b described in the first embodiment is referred to as "first split layer 122b".

Figure 7:
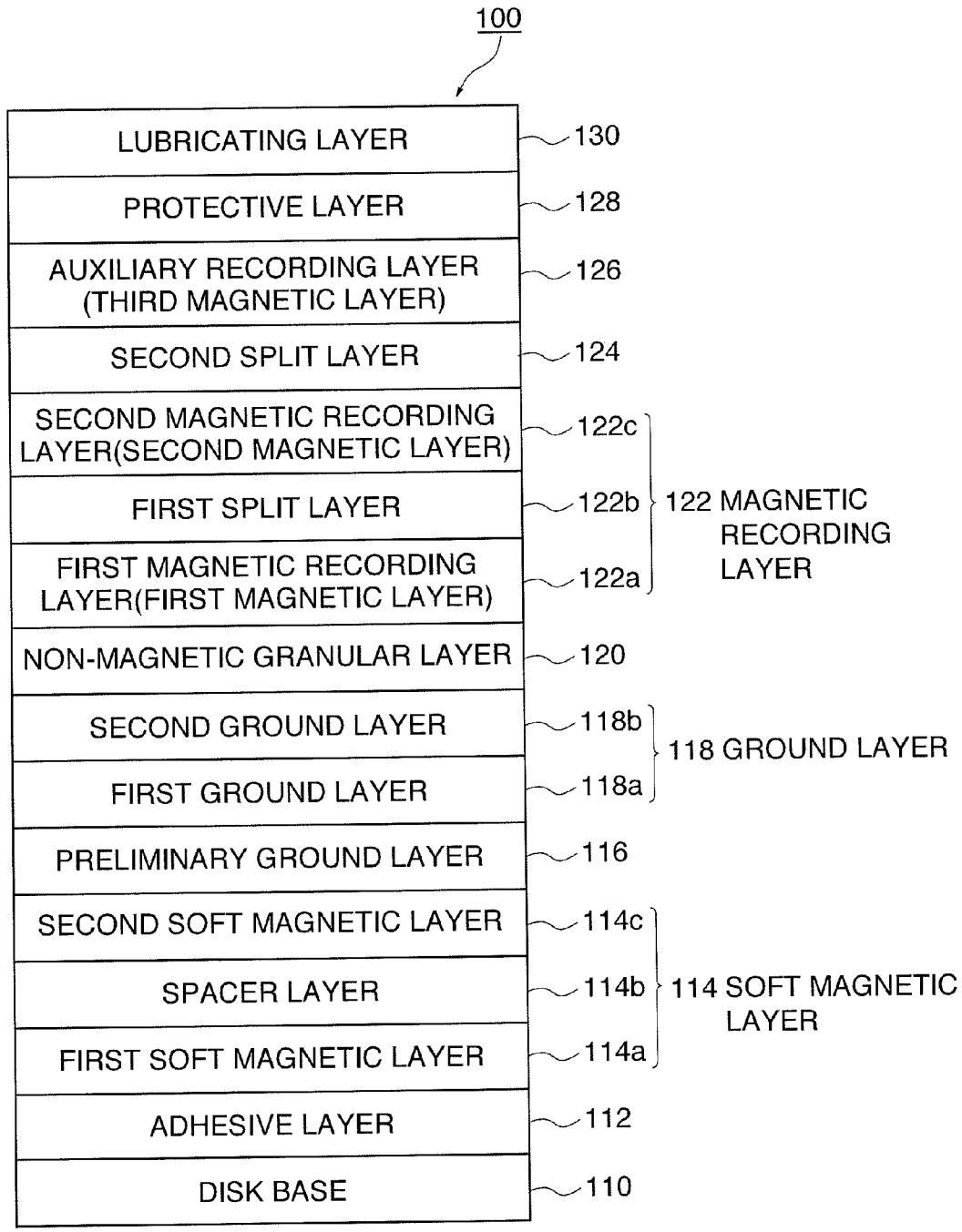
FIG. 7 is a diagram for describing the structure of a perpendicular magnetic recording medium.

FIG. 7 is a diagram for describing the structure of a perpendicular magnetic recording medium 100 according to the second embodiment. The perpendicular magnetic recording medium 100 according to the second embodiment has the same structure as the first embodiment except for the magnetic recording layer 122 and the second split layer 124. The magnetic recording layer 122 is composed of the first magnetic recording layer 122a (first magnetic layer), the first split layer 122b, and the second magnetic recording layer 122c (second magnetic layer), and the second split layer 124 and the auxiliary recording layer 126 (third magnetic layer) are formed on the magnetic recording layer 122 in this order.

The first split layer 122b is a non-magnetic thin film, and interposed between the first magnetic recording layer 122a and the second magnetic recording layer 122c so that magnetic continuity is split between these magnetic layers. The split layer 122b can be composed of Ru or a Ru alloy, and additionally can contain oxygen or an oxide. The split layer 122b is configured to have a predetermined film thickness to generate antiferro-magnetic exchange coupling (AFC) between the first magnetic recording layer 122a and the second magnetic recording layer 122c. Since this makes the directions of magnetization of the magnetic layers on and just below the first split layer 122b antiparallel to each other, so that the directions of magnetization interact with each other so as to fix the directions of magnetization, fluctuation of the axis of magnetization is reduced, and noise is reduced.

In terms of crystalline structure, the split layer 122b is an extremely thin film, and therefore does not disturb the inheritance of the crystal orientation between the first magnetic recording layer 122a and the second magnetic recording layer 122c. Since the first split layer 122b does not contain as much oxygen as the magnetic recording layer, no grain boundary is formed in the first split layer 122b, but it is thought that the first split layer 122b does not disturb crystal growth, since the first split layer 122b is an extremely thin film with a thickness of 1 nm or less and Ru has a hcp structure.

The second split layer 124 is a non-magnetic layer provided between the magnetic recording layer 122 (the second magnetic recording layer 122c) and the auxiliary recording layer 126. The second split layer 124 can be composed of Ru or a Ru alloy, and additionally can contain oxygen or an oxide. The second split layer 124 is configured to have a predetermined film thickness to generate ferromagnetic exchange coupling (FC) between the second magnetic recording layer 122c and the auxiliary recording layer 126.

Providing the second split layer 124 thus configured makes it possible to reduce noise thought to be due to the auxiliary recording layer 126 to improve the SNR. It is thought that this is because the auxiliary recording layer 126 can adjust a fine structure inherited from the magnetic recording layer 122 as the effect of crystal structure when the auxiliary recording layer 126 makes crystal growth. In a portion of the second split layer 124 positioned on the magnetic particles of the magnetic recording layer 122, Ru causes Co of the auxiliary recording layer 126 to inherit the crystal structure of Co of the magnetic recording layer 122. In a portion of the second split layer 124 positioned on the grain boundary of the magnetic recording layer 122, because oxygen and Ru forming the grain boundary are substantially different in lattice constant from each other, inheritance of the crystalline orientation does not occur, but RU and oxygen freely migrate to form a coating film (crystal). Since the auxiliary recording layer 126 is formed on the crystal of Ru, separation of the Co particles of the auxiliary recording layer 126 is further promoted to achieve noise reduction. Therefore, the crystalline orientation of the auxiliary recording layer 126 is improved as a whole.

Even if the split layers (the first split layer 122b, the second split layer 124) are composed of only Ru, improvement in OW characteristic or the like can be observed. Ru is preferred, since Ru is close in lattice constant to Co constituting the magnetic particles, and therefore does not easily disturb epitaxial growth of Co crystal particles even if it is interposed between the magnetic layers. However, remarkable improvement in SNR can be observed when the Ru contains oxygen. It is thought that this is because oxygen atoms contained in the split layer has a high affinity for oxygen atoms contained in the grain boundary in the magnetic recording layer, and selectively segregate. Particularly in the second split layer 124, it is thought that by causing the second split layer 124 to contain a lower percent of oxygen than the percentage of oxide contained in the magnetic recording layer 122, the second split layer is allowed to act as a magnetic and structural bridge between the grain boundary of the magnetic recording layer 122 containing a large amount of oxygen and the auxiliary recording layer 126 containing no oxygen.

Oxygen contained in Ru in the split layer includes either one or both of oxygen atoms as a single body and oxygen atoms as an oxide. Ru is caused to contain a slight amount of oxygen by a method of causing a target to contain oxygen in advance or by reactive sputtering that oxygen is added to atmosphere gas during sputtering. The reactive sputtering is a method of forming a compound film or mixed film of the atoms of a target and the atoms of active gas by adding the active gas to atmosphere gas supplied into a chamber where sputtering is performed. Therefore, by adding oxygen gas as active gas during sputtering of the split layer, the split layer can be caused to contain oxygen.

However, regarding the reactive sputtering, because a small amount of oxygen gas is added to the atmosphere gas, it is very difficult to adjust the amount of oxygen contained in the split layer to a desired amount. It is also difficult to adjust the active gas so as to distribute evenly in the atmosphere gas, and therefore distribution of oxygen becomes uneven in the split layer. Furthermore, it is difficult to completely evacuate the oxygen gas mixed in the split layer during formation of the split layer, the oxygen gas remaining in the chamber enters a chamber where the layers following the split layer are formed. Therefore, it is preferred that the split layer is subjected to the sputtering using a target made of Ru and an oxide, because oxygen can be caused to be contained evenly in the whole of the film.

As a specific example, the composition of the split layer may be RuO, $RuWO_3$, or $RuTiO_2$. As described above, it is preferred that the split layer is caused to contain oxygen by causing a target for sputtering to contain an oxide. There are various possible oxides, but in particular, by using an oxide of W, Ti, or Ru, the electromagnetic conversion characteristic (SNR) can be improved. Of them, $WO_3$ can obtain a high effect. This is because $WO_3$ is an unstable oxide, and therefore oxygen is dissociated during sputtering, and the oxygen dissociated also exhibits the effect of oxygen addition. That is, using $WO_3$ produces both the effect of oxygen addition and the effect of oxide addition, and therefore $WO_3$ is preferred. Other examples of the oxide can include silicon oxide ($SiO_x$), chromium (Cr), chromium oxide ($Cr_xO_y$), titanium oxide ($TiO_2$), zircon oxide ($ZrO_2$), tantalum oxide ($Ta_2O_5$), iron oxide ($Fe_2O_3$), boron oxide ($B_2O_3$), and the like. It is also preferred to use a nitride such as BN or a carbide such as $B_4O_3$.

Incidentally, it is preferred that the second split layer 124 is non-magnetic, but may be slightly magnetized. $RuCo_{50}$ can be involved as a specific example. In particular, $RuCo_{50}$ is superior in improving the SNR because Co can inherit the crystal orientation from the magnetic recording layer toward the auxiliary recording layer.

The thicknesses of the split layers (the first split layer 122b, the second split layer 124) may be in a range of 2 Å to 10 Å, respectively. In particular, by setting the thicknesses in the range of 7 Å to 9 Å, strong exchange coupling can be obtained. If the respective film thicknesses of the split layers are set at 10 Å or more, the magnetic layers on and just below the respective split layers are magnetically completely split from each other and inheritance of crystal orientation from one to the other is completely lost. Furthermore, if the film thicknesses become 10 Å or more, the exchange coupling generated between the magnetic layers is weakened, and therefore it becomes impossible to obtain a desired SNR. On the other hand, if the film thicknesses are 2 Å or less, there is a possibility that the split layers cannot form a coating film. The strength of exchange coupling attenuates while fluctuating between FC and AFC according to the thicknesses of the intervening split layers, it is preferred that the film thickness of the split layer 122b is set so as to obtain the peak of AFC, and the film thickness of the second split layer 124 is set so as to obtain the peak of FC. The film thicknesses that generate these peaks are obtained by experiment according to the upper and lower magnetic recording layers and the material of the split layers.

Figure 8:
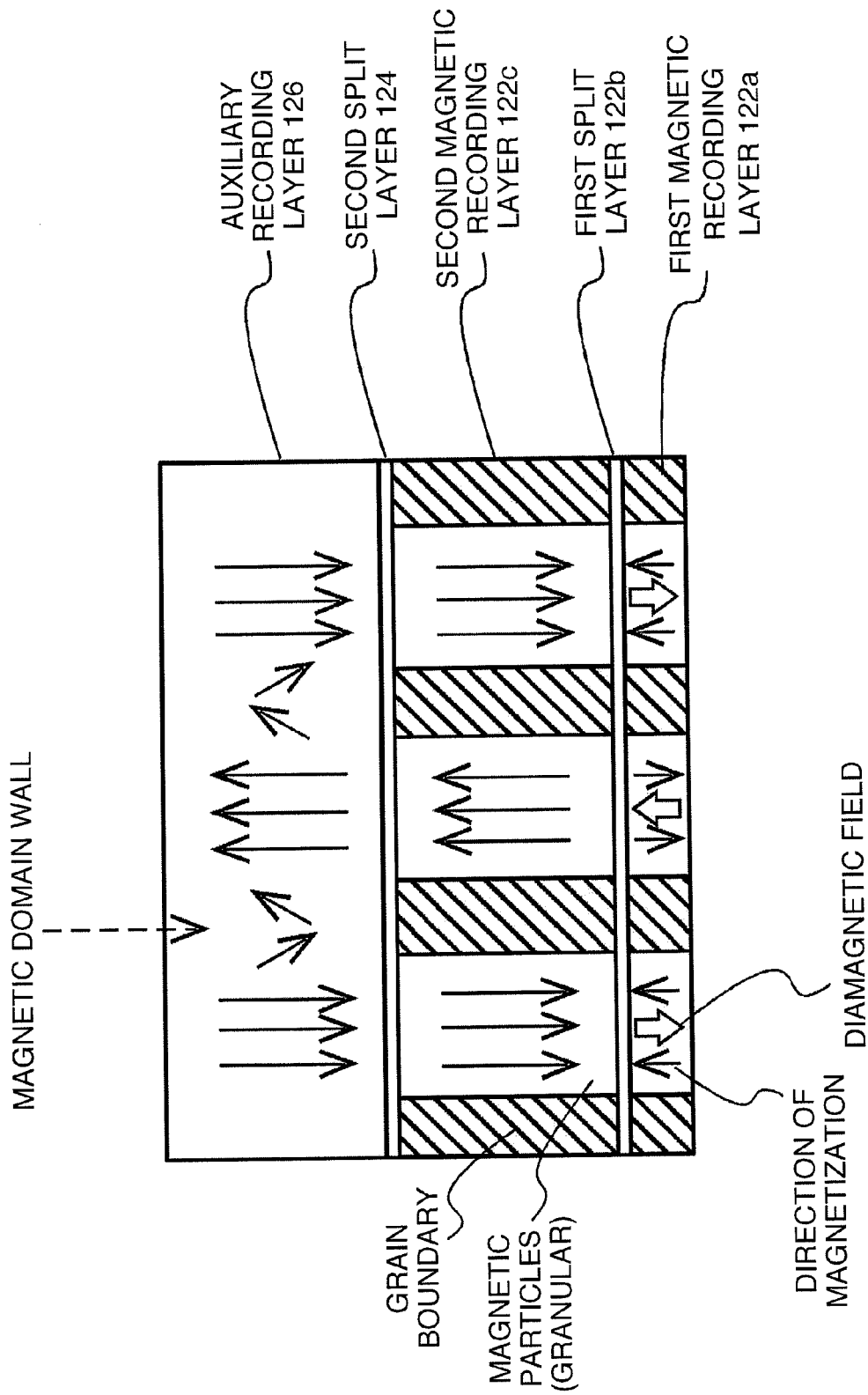
FIG. 8 is a diagram for describing a model of two antiferromagnetic exchange couplings composed of a first magnetic recording layer, a first split layer, a second magnetic recording layer, a second split layer, and an auxiliary recording layer.

FIG. 8 is a diagram for describing a model of two magnetic couplings composed of the first magnetic recording layer 122a, the first split layer 122b, the second magnetic recording layer 122c, the second split layer 124, and the auxiliary recording layer 126. As shown in FIG. 8, the directions of magnetization of the first magnetic recording layer 122a and the second magnetic recording layer 122c are made antiparallel to each other by AFC coupling, the directions of magnetization of the second magnetic recording layer 122c and the auxiliary recording layer 126 are made parallel to each other by FC coupling, and in both the cases, the action to fix the directions of magnetization mutually occurs. Therefore, the fluctuation of the axis of magnetization is reduced, and accordingly noise is reduced.

Without the first split layer 122b, the first magnetic recording layer 122a would be a magnet continuous with the second magnetic recording layer 122c, but here, since the first split layer 122b splits them, the first magnetic recording layer 122a constitutes an individual short magnet. Then, by further reducing the film thickness of the first magnetic recording layer 122a, a height to width ratio of the granular magnetic particles is reduced (in the perpendicular magnetic recording medium, a direction along the film thickness corresponds to an axial direction of an axis of easy magnetization), and thus a diamagnetic field occurring inside the magnet becomes intense. Therefore, even though the first magnetic recording layer 122a is hard magnetic, a magnetic moment generated therefrom outwardly becomes small to such an extent that the magnetic head cannot easily sense it. That is, by adjusting the film thickness of the first magnetic recording layer 122a, the magnetic moment (strength of a magnet) of the first magnetic recording layer 122a is set such that the magnetic flux does not easily reach the magnetic head and such that the first magnetic recording layer 122a magnetically interacts with the second magnetic recording layer 122c, so that the magnetic recording layer 122 that exerts high a coercive force but is reduced in noise can be obtained.

The thickness of the first magnetic recording layer 122a may be 5 nm or less. In this case, it is preferred that the first magnetic recording layer 122a is a layer having a small amount of grain boundary portion and having a high coercive force Hc, and the second magnetic recording layer 122c is a layer having a large amount of grain boundary portion (a large amount of oxide) and having a high SNR. This enhances the diamagnetic field of the first magnetic recording layer 122a so that the magnetic moment generated from the first magnetic recording layer 122a can be reduced. Therefore, the noise from the first magnetic recording layer 122a does not reach the magnetic head, and thus the amount of oxide of the first magnetic recording layer 122a can be reduced to increase the coercive force Hc, so that the first magnetic recording layer 122a can act as a pin layer that fixes the direction of magnetization of the second magnetic recording layer 122c.

The magnetic recording layer 122 may include two or more kinds of oxides. This makes it possible to obtain characteristics of a plurality of oxides, and therefore it becomes possible to obtain a perpendicular magnetic recording medium that achieves further refinement and isolation of the magnetic particles of the magnetic recording layer 122 to reduce noise and improve the SNR so that a high recording density is achieved.

The magnetic recording layer 122 may include $SiO_2$ and $TiO_2$ as oxides. $SiO_2$ has a characteristic of promoting refinement and isolation of magnetic particles, and $TiO_2$ has a characteristic of improving an electromagnetic conversion characteristic (particularly, SNR). By causing these oxides in combination to segregate to the grain boundary of the magnetic recording layer 122, both their advantages can be gained.

The magnetic recording layer 122 may include 5 mol % or more of oxide constituting a grain boundary portion. This is because, when 5 mol % or more of oxide is included, high magnetostatic characteristic and electromagnetic conversion characteristic can be obtained, and the characteristic of the auxiliary recording layer 126 is lowered, which cannot be ignored, when the oxide is in such a range, but the characteristic can be improved by providing the above second split layer 124.

EXAMPLES

The adhesion layer 112 to the auxiliary recording layer 126 were sequentially formed on the disk base 110 in an Ar atmosphere by DC magnetron sputtering using an apparatus for film formation that was subjected to vacuuming. The adhesion layer 112 was composed of CrTi. Regarding the soft magnetic layer 114, the compositions of the first soft magnetic layer 114a and the second soft magnetic layer 114c were CoCrTaZr, and the composition of the spacer layer 114b was Ru. The composition of the preliminary ground layer 116 was a NiW alloy having an fcc structure. As the first ground layer 118a, a Ru film was formed under an Ar atmosphere at a predetermined pressure (low pressure: for example, 0.6 to 0.7 Pa). As the second ground layer 118b, a Ru film containing oxygen was formed under an Ar atmosphere at a higher pressure than the predetermined pressure (high pressure: for example, 4.5 to 7 Pa) by using a target containing oxygen. The composition of the non-magnetic granular layer 120 was non-magnetic CoCr—$SiO_2$. As the first magnetic recording layer 122a, a film having an hcp crystal structure of CoCrPt—$Cr_2O_3$ containing $Cr_2O_3$ as an example of an oxide in the grain boundary portion was formed. As the second magnetic recording layer 122c, a film having an hcp crystal structure of CoCrPt—$SiO_2$—$TiO_2$ containing $SiO_2$ and $TiO_2$ as an example of a composite oxide (plural kinds of oxides) in the grain boundary portion was formed. Regarding the first split layer 122b and the second split layer 124, the film thicknesses thereof were set at 8 Å and 4 Å, respectively, and the following examples and comparative examples thereof different in composition were produced and compared. The composition of the auxiliary recording layer 126 was CoCrPtB. The medium protecting layer 128 was formed by CVD method using $C_2H_4$ and CN, and the lubricating layer 130 was formed by dip coating using PFPE.

Figure 9:
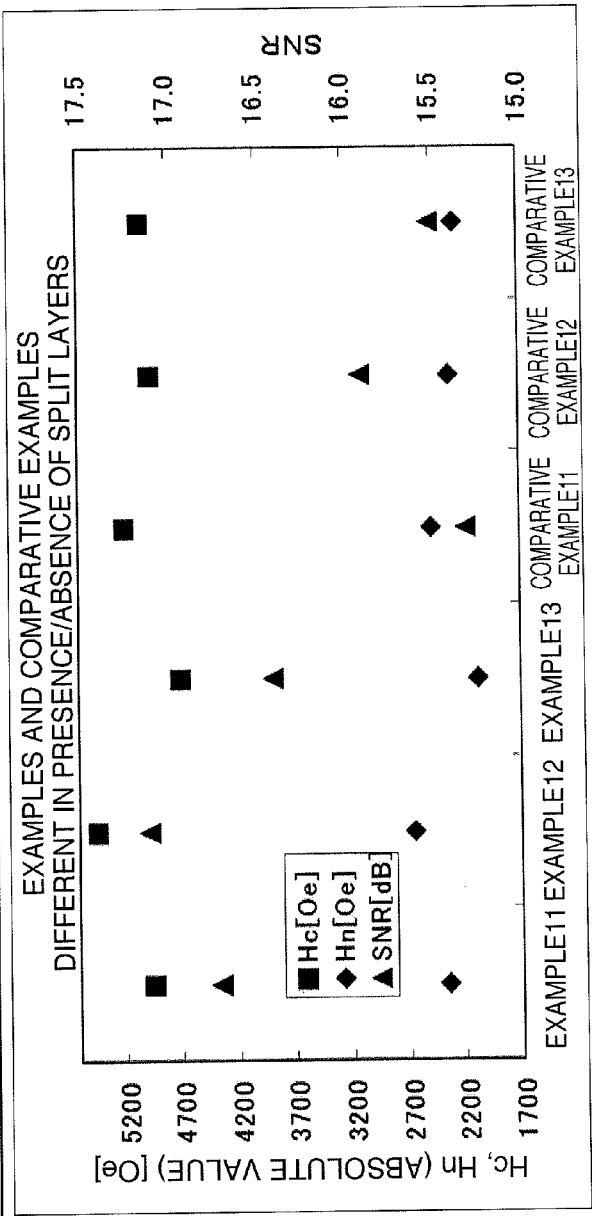
FIG. 9 is a diagram including a table and a graph, showing examples and comparative examples different in that a nonmagnetic split layer is provided or not.

FIG. 9 is a diagram including a table and a graph, showing examples and comparative examples different in that a split layer is provided or not. An example 11 is an example in which the first split layer 122b and the second split layer 124 were provided and the second magnetic recording layer 122c contained plural oxides in combination, an example 12 is an example in which CoO was further added to the second magnetic recording layer 122c as an oxide in the example 12, and an example 13 is a case where the oxide was a single material. A comparative example 11 is an example in which the first split layer 122b and the second split layer 124 were not provided, a comparative example 12 is an example in which only the second split layer 124 was provided, and a comparative example 13 is an example in which only the first split layer 122b was provided. Regarding each of the examples and comparative examples, the coercive force Hc and the reversed magnetic domain nucleation magnetic field Hn as magnetostatic characteristic, and the SNR as electromagnetic conversion characteristic were measured. Higher absolute values of the coercive force Hc and the reversed magnetic domain nucleation magnetic field Hn are better, and therefore the absolute values thereof are coaxially shown in the graph.

As can be seen in FIG. 9, the coercive forces Hc and the reversed magnetic domain nucleation magnetic fields Hn of the examples are improved as compared with those of the comparative examples, in particular, the SNRs thereof are remarkably improved. In comparison among the comparative example 11 to the comparative example 13, the comparative example 12 proves that the second split layer 124 improves the SNR, and the comparative example 13 proves that the first split layer 122b also slightly improves the SNR. However, by providing both the split layers like the examples, significant improvement in performance can be achieved.

Comparison between the example 11 and the example 13 reveals that it is more effective to mix plural oxides as the oxide in the second magnetic recording layer 122c. The example 12 reveals that the Hc, Hn, and SNR are further increased by adding CoO.

Figure 10:
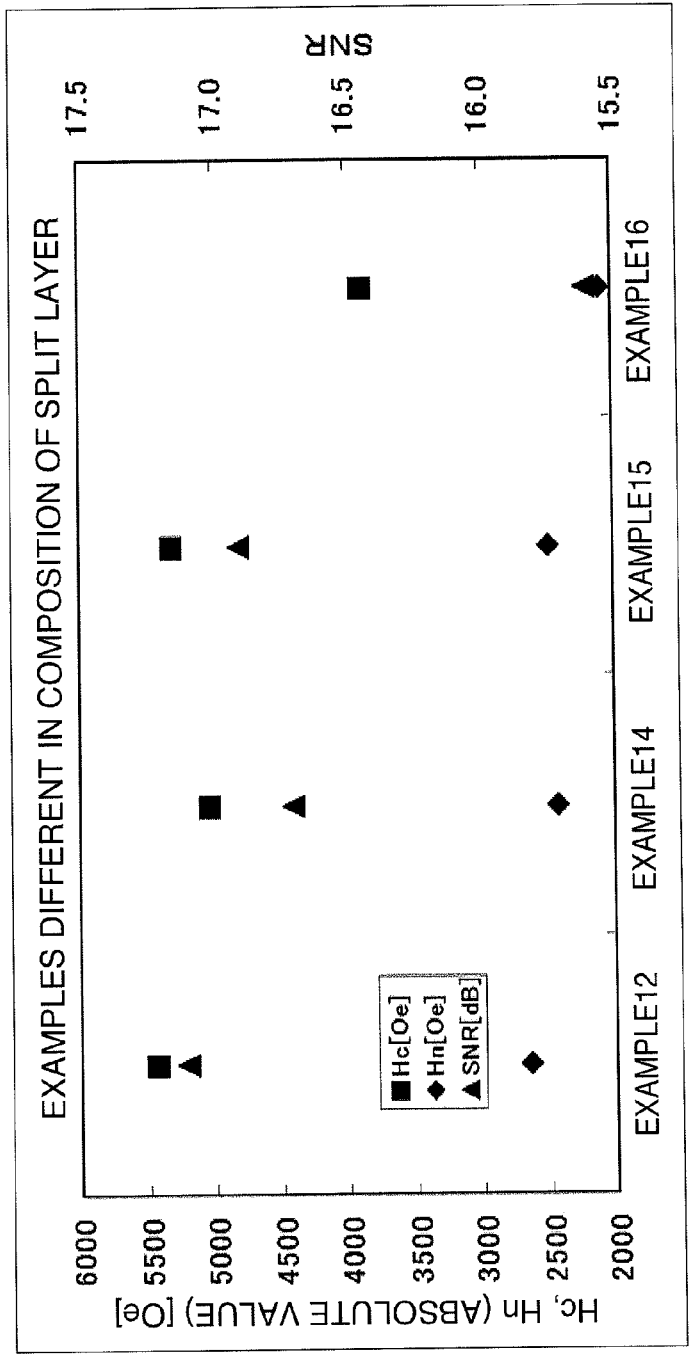
FIG. 10 is a diagram including a table and graph, showing a result of comparison between examples different in composition of the split layer.

FIG. 10 is a diagram a table and a graph, showing a result of comparison between examples different in composition of the second split layer 124. The example 12 is an example in which the second split layer 124 was composed of $RuWO_3$, an example 14 is an example in which the second split layer 124 was composed of Ru—$SiO_2$, an example 15 is an example in which the second split layer 124 was formed by Ru+$O_2$ exposure, and an example 16 is an example in which the second split layer 124 was composed of only Ru.

In FIG. 10, it can be seen that the SNRs of the examples 12 to 15 containing oxygen were improved as compared with the example 16 composed of only Ru. Among them, the SNR of the example 12 in which the split layer was composed of $RuWO_3$ was improved the most.

As described above, according to the present invention, the SNR of the magnetic recording layer can be further improved. This makes it possible to achieve a higher recording density of the perpendicular magnetic recording medium 100.

FIG. 11 shows TEM photographs of the auxiliary recording layers 126 of the example 11 (a case where the second split layer 124 was provided) and the comparative example 11 (a case where the second split layer 124 was not provided). Referring to FIG. 4, it can be seen that the fine structure of the auxiliary recording layer 126 is fuzzy in the comparative example 11, but separation of particles is clearly promoted in the example 11. That is, it can be said that separation of crystal particles is promoted in a magnetic layer disposed on a split layer. This can support that noise reduction of the auxiliary recording layer 126 can be achieved by the split layer 124.

As described above, according to the perpendicular magnetic recording medium 100 according to the first embodiment, the noise thought to be due to the auxiliary recording layer is reduced so that improvement in SNR can be achieved. This makes it possible to achieve a higher recording density of the perpendicular magnetic recording medium 100.

Hereinabove, the preferred embodiments of the present invention have been described with reference to the appended drawings. Needless to say, however, the present invention is not restricted by these embodiments. It is clear that the person skilled in the art can conceive various modifications or variations within the scope of claims for patent, and it should be understood that these modifications belong to the technical scope of the present invention.

Industrial Applicability

The present invention can be utilized as a perpendicular magnetic recording medium to be mounted on an HDD or the like of a perpendicular magnetic recording type.

The invention claimed is:

1. A perpendicular magnetic recording medium, comprising:
   a base;
   a first magnetic layer having a granular structure in which a non-magnetic grain boundary portion is formed between crystal particles grown in a columnar shape;
   a non-magnetic split layer containing (1) at least one of Ru and an Ru alloy and (2) an oxide, and being disposed directly on the first magnetic layer; and
   a second magnetic layer that is disposed directly on the split layer and that has a granular structure in which a non-magnetic grain boundary portion is formed between crystal particles grown in a columnar shape, wherein
   the first magnetic layer and the second magnetic layer contain oxides which form the grain boundary portion, and when an oxide content of the first magnetic layer is represented by A and an oxide content of the second magnetic layer is represented by B, a relationship between the oxide contents A/B is in the range of 0.7<A/B<0.9,
   wherein the split layer is a single coating film in a range of 2 Å to 10 Å in film thickness, has no grain boundaries, and is operative to interrupt magnetism between the first magnetic layer and the second magnetic layer to generate antiferro-magnetic exchange coupling,
   wherein the first magnetic layer is in a range of 0.7 nm to 3.0 nm in film thickness, and wherein the first magnetic layer and second magnetic layer are different in composition and thickness from each other, whereby said medium has a Hc of 4900 Oe or more and a SNR of 17.7 dB or more.

2. The perpendicular magnetic recording medium according to claim 1, wherein the non-magnetic split layer comprises a material selected from a group consisting of RuO, RuCo, RuCr, $RuSiO_2$, $RuTiO_2$, $RuCr_2O_3$, $RuWO_3$, and $RuTa_2O_5$.

3. The perpendicular magnetic recording medium according to claim 1, wherein the first magnetic layer contains 5 mol % or more of oxide constituting the grain boundary portion.

4. The perpendicular magnetic recording medium according to claim 1, wherein the second magnetic layer contains 5 mol % or more of oxide constituting the grain boundary portion.

5. The perpendicular magnetic recording medium according to claim 1, wherein the second magnetic layer contains two or more kinds of oxides.

6. The perpendicular magnetic recording medium according to claim 1, wherein the second magnetic layer contains one or plural oxides selected from a group consisting of $SiO_2$, $TiO_2$, and CoO.

7. The perpendicular magnetic recording medium according to claim 1, wherein the first magnetic recording layer is formed of $CoCrPt$—$Cr_2O_3$.

8. The perpendicular magnetic recording medium according to claim 1, wherein the second magnetic recording layer is formed of $CoCrPt$—$SiO_2$—$TiO_2$.

9. The perpendicular magnetic recording medium according to claim 1, wherein the first magnetic recording layer is formed of $CoCrPt$—$Cr_2O_3$ and the second magnetic recording layer is formed of $CoCrPt$—$SiO_2$—$TiO_2$.

* * * * *